United States Patent
Iwami et al.

(10) Patent No.: US 10,085,068 B2
(45) Date of Patent: Sep. 25, 2018

(54) INFORMATION PROCESSING APPARATUS AND INFORMATION PROCESSING METHOD

(71) Applicant: SONY CORPORATION, Tokyo (JP)

(72) Inventors: Hideki Iwami, Saitama (JP); Masanori Sato, Tokyo (JP); Osamu Yoshimura, Kanagawa (JP); Yasushi Katayama, Tokyo (JP); Sho Amano, Tokyo (JP); Chihiro Fujita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 54 days.

(21) Appl. No.: 14/951,140

(22) Filed: Nov. 24, 2015

(65) Prior Publication Data

US 2016/0080825 A1 Mar. 17, 2016

Related U.S. Application Data

(63) Continuation of application No. PCT/JP2014/059936, filed on Apr. 4, 2014.

(30) Foreign Application Priority Data

May 31, 2013 (JP) .................................. 2013-115850

(51) Int. Cl.
*H04N 21/6373* (2011.01)
*H04N 21/2343* (2011.01)
(Continued)

(52) U.S. Cl.
CPC ..... *H04N 21/6373* (2013.01); *H04L 65/4092* (2013.01); *H04L 65/601* (2013.01);
(Continued)

(58) Field of Classification Search
CPC ............. H04N 21/218; H04N 21/2343; H04N 21/234363; H04N 21/258;
(Continued)

(56) References Cited

U.S. PATENT DOCUMENTS

2002/0157030 A1* 10/2002 Barker .................... H04L 12/12
713/320
2012/0178368 A1* 7/2012 Fleck ................ H04W 52/0274
455/41.2
(Continued)

FOREIGN PATENT DOCUMENTS

JP 09-135202 A 5/1997
JP 2007-060029 A 3/2007
(Continued)

*Primary Examiner* — Jeremy S Duffield
(74) *Attorney, Agent, or Firm* — Chip Law Group

(57) ABSTRACT

To perform an appropriate data transmission rate control. An information processing apparatus is an information processing apparatus that receives a stream for outputting image information from another information processing apparatus through wireless communications, and includes a wireless communication unit and a control unit. The wireless communication unit performs communications with the other information processing apparatus for exchanging capability information on the information processing apparatus and capability information on the other information processing apparatus. The control unit performs a stream data transmission rate control relating to the other information processing apparatus, according to the capability information on the other information processing apparatus, radio propagation measurement information on communications with the other information processing apparatus, and usage of the information processing apparatus.

11 Claims, 21 Drawing Sheets a b

(51) Int. Cl.
  H04N 21/4363  (2011.01)
  H04N 21/258   (2011.01)
  H04N 21/436   (2011.01)
  H04N 21/63    (2011.01)
  H04N 21/218   (2011.01)
  H04L 29/06    (2006.01)
  H04W 4/06     (2009.01)
  H04W 28/02    (2009.01)
  H04W 28/22    (2009.01)
  H04N 21/442   (2011.01)
  H04N 21/45    (2011.01)
  H04N 21/6437  (2011.01)
  H04W 8/22     (2009.01)
  H04N 21/239   (2011.01)
  H04W 28/20    (2009.01)

(52) U.S. Cl.
  CPC ......... *H04L 65/602* (2013.01); *H04L 65/608* (2013.01); *H04L 65/80* (2013.01); *H04N 21/218* (2013.01); *H04N 21/2343* (2013.01); *H04N 21/2393* (2013.01); *H04N 21/234363* (2013.01); *H04N 21/258* (2013.01); *H04N 21/25808* (2013.01); *H04N 21/25825* (2013.01); *H04N 21/25833* (2013.01); *H04N 21/436* (2013.01); *H04N 21/4363* (2013.01); *H04N 21/43637* (2013.01); *H04N 21/44227* (2013.01); *H04N 21/4516* (2013.01); *H04N 21/632* (2013.01); *H04N 21/6437* (2013.01); *H04W 4/06* (2013.01); *H04W 8/22* (2013.01); *H04W 28/02* (2013.01); *H04W 28/22* (2013.01); *H04W 28/20* (2013.01)

(58) Field of Classification Search
  CPC ....... H04N 21/25808; H04N 21/25825; H04N 21/25833; H04N 21/436; H04N 21/4363; H04N 21/43637; H04N 21/632; H04N 21/6373; H04N 21/6437
  USPC .................................................. 725/105–134
  See application file for complete search history.

(56) References Cited

U.S. PATENT DOCUMENTS

| 2012/0243524 | A1  | 9/2012 | Verma et al. |
| 2013/0002949 | A1* | 1/2013 | Raveendran ......... H04W 28/18 348/469 |
| 2013/0195119 | A1* | 8/2013 | Huang ................ H04L 65/4092 370/468 |
| 2013/0246576 | A1* | 9/2013 | Wogsberg ........... H04N 21/4122 709/219 |

FOREIGN PATENT DOCUMENTS

| JP | 2008-278388 A | 11/2008 |
| WO | 2012-078527 A2 | 6/2012 |

* cited by examiner

FIG. 4

MANAGEMENT INFORMATION HOLDING UNIT 390

| TERMINAL IDENTIFICATION INFORMATION 391 | FREQUENCY CHANNEL 392 | RADIO PROPAGATION MEASUREMENT INFORMATION 393 | | | | | DEVICE INFORMATION 394 | BAND USAGE LEVEL 395 | OUTPUT FORM 396 | STANDBY/ WAKEUP 397 |
|---|---|---|---|---|---|---|---|---|---|---|
| | | PER | BER | NUMBER OF PACKET RETRANSMISSIONS | THROUGHPUT | DROPPING FRAME | SIR (RSSI) | | | | |
| DSC200 | 60GHz | ... | ... | ... | ... | ... | ... | MOBILE | 20Mbps | SUB | STANDBY |
| DR400 | 2.4GHz | ... | ... | ... | ... | ... | ... | STATIONARY | 20Mbps | MAIN | WAKEUP |

FIG. 5
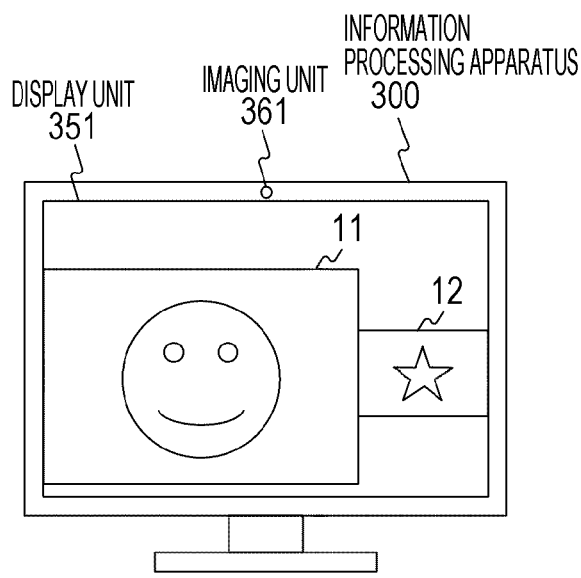
a
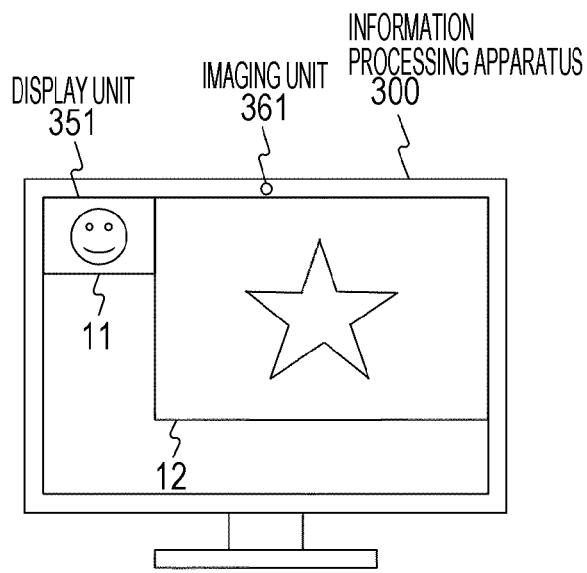
b

INFORMATION PROCESSING APPARATUS AND INFORMATION PROCESSING METHOD

TECHNICAL FIELD

The present technology relates to an information processing apparatus, more specifically, to an information processing apparatus and an information processing method for exchanging various kinds of information through wireless communications.

BACKGROUND ART

Conventionally, there are wireless communication techniques for exchanging various kinds of data through wireless communications. For example, there has been proposed an information exchange apparatus that allows exchange of various kinds of data between two wireless communication apparatuses through wireless communications (for example, refer to Patent Document 1).

CITATION LIST

Patent Document

Patent Document 1: JP 2008-278388 A

SUMMARY OF THE INVENTION

Problems to be Solved by the Invention

According to the foregoing conventional technique, the two wireless communication apparatuses can exchange various kinds of data therebetween through wireless communications without connection via a wired line. For example, an image based on image data transmitted from the information processing apparatus at the transmission side can be displayed on a display unit of the information processing apparatus at the reception side.

For example, a plurality of information processing apparatuses may exist at the transmission side, and a plurality of images based on image data transmitted from these information processing apparatuses may be displayed on the display unit of the information processing apparatus at the reception side. In this case, it is important to perform an appropriate data transmission rate control according to the communication status.

The present technology is devised in view of such circumstances, and an object of the present technology is to perform an appropriate data transmission rate control.

Solutions to Problems

The present technology has been made to achieve the above object, and a first aspect of the present technology is an information processing apparatus that receives a stream for outputting image information from another information processing apparatus through wireless communications, an information processing method of the information processing apparatus, and a program causing a computer to execute the method, the information processing apparatus including: a wireless communication unit that performs communications with the other information processing apparatus for exchanging capability information on the information processing apparatus and capability information on the other information processing apparatus; and a control unit that performs a stream data transmission rate control relating to the other information processing apparatus, according to the capability information on the other information processing apparatus, radio propagation measurement information on communications with the other information processing apparatus, and usage of the information processing apparatus. The present technology makes it possible to perform the data transmission rate control on the stream relating to the other information processing apparatus, based on the capability information on the other information processing apparatus, the radio propagation measurement information on communications with the other information processing apparatus, and the usage of the information processing apparatus.

Further, in the first aspect, the information processing apparatus and the other information processing apparatus may be information processing apparatuses capable of performing wireless communications using a plurality of frequency channels, and the control unit may perform a control for setting one of the plurality of frequency channels, according to the capability information on the other information processing apparatus, the radio propagation measurement information, and the usage of the information processing apparatus. This makes it possible to set one of the plurality of frequency channels, based on the capability information on the other information processing apparatus, the radio propagation measurement information, and the usage of the information processing apparatus.

Further, in the first aspect, the control unit may perform a control for setting the one frequency channel, according to the radio propagation measurement information obtained by measuring a stream from the other information processing apparatus with switchover between the plurality of frequency channels and the usage of the information processing apparatus. This makes it possible to set one frequency channel, based on the radio propagation measurement information obtained by measuring the stream from the other information processing apparatus with switchover between the plurality of frequency channels and the usage of the information processing apparatus.

Further, in the first aspect, the control unit may perform a control for, when communication quality specified by the radio propagation measurement information becomes degraded and the data transmission rate control needs to be limited, changing from the frequency channel to be used to another frequency channel at a higher data transmission rate, according to the radio propagation measurement information and the usage of the information processing apparatus. This makes it possible to, when the communication quality specified by the radio propagation measurement information degrades and the data transmission rate control needs to be limited, change the frequency channel to be used to another frequency channel at a higher data transmission rate, based on the radio propagation measurement information and the usage of the information processing apparatus.

Further, in the first aspect, the control unit may perform a control for, when communication quality specified by the radio propagation measurement information becomes degraded and the data transmission rate control needs to be limited, changing from the frequency channel to be used to another frequency channel at a lower data transmission rate, according to the radio propagation measurement information and the usage of the information processing apparatus. This makes it possible to, when the communication quality specified by the radio propagation measurement information degrades and the data transmission rate control needs to be limited, change the frequency channel to be used to another frequency channel at lower data transmission rate, based on the radio propagation measurement information and the usage of the information processing apparatus.

Further, in the first aspect, the control unit may perform a control for limiting the data transmission rate before switching from the currently used frequency channel to another frequency channel. This makes it possible to perform a control for limiting the data transmission rate prior to switching from the currently used frequency channel to another frequency channel.

Further, in the first aspect, the control unit may perform a control for displaying at a display unit display information on permission of disconnection of the currently frequency channel. This makes it possible to display the display information on permission of disconnection of the currently used frequency channel on the display unit.

Further, in the first aspect, the control unit may perform a control for switching the frequency channel, on acceptance of, by an operation acceptance unit, a user operation indicating that the disconnection of the currently used frequency channel is not permitted. This makes it possible to switch the frequency channel when the operation acceptance unit has accepted a user operation indicating that the disconnection of the currently used frequency channel is not permitted.

Further, in the first aspect, the wireless communication unit may exchange the capability information by capability negotiation or capability re-negotiation set forth in Wi-Fi Display specifications. This makes it possible to perform exchange of the capability information by capability negotiation or capability re-negotiation set forth in Wi-Fi Display specifications.

Further, in the first aspect, the capability information may be exchanged using RTSP M3 messages by capability negotiation or capability re-negotiation. This makes it possible to perform exchange of the capability information by RTSP M3 messages in capability negotiation or capability re-negotiation.

Further, a second aspect of the present technology is an information processing apparatus that transmits a stream for outputting image information to another information processing apparatus through wireless communications, an information processing method of the information processing apparatus, and a program causing a computer to execute the method, the information processing apparatus including: a wireless communication unit that performs communications with the other information processing apparatus for exchanging capability information on the information processing apparatus and capability information on the other information processing apparatus; and a control unit that performs a stream data transmission rate control relating to the other information processing apparatus, under control of the other information processing apparatus, according to the capability information on the information processing apparatus, radio propagation measurement information on communications with the other information processing apparatus, and usage of the other information processing apparatus. This makes it possible to perform the data transmission rate control on the stream relating to the other information processing apparatus, under control of the other information processing apparatus based on the capability information on the information processing apparatus, the radio propagation measurement information on communications with the other information processing apparatus, and the usage of the other information processing apparatus.

Effects of the Invention

The present technology produces an excellent advantage of allowing an appropriate data transmission rate control.

BRIEF DESCRIPTION OF DRAWINGS

FIG. 4 is a schematic diagram illustrating an example of contents held in a management information holding unit 390 in the first embodiment of the present technology.

FIG. 5 is a diagram illustrating a transition example of images displayed at a display unit 351 of the information processing apparatus 300 in the first embodiment of the present technology.

MODES FOR CARRYING OUT THE INVENTION

Modes for carrying out the present technology (hereinafter, referred to as embodiments) will be described below. The description will be given in the following order:

1. First embodiment (an example of performing a control relating to wireless communications based on user information and management information)
2. Second embodiment (an example of setting an appropriate frequency channel for a source device capable of using a plurality of frequency channels)
3. Application examples

1. First Embodiment

[Configuration Example of Communication System]

Figure 1:
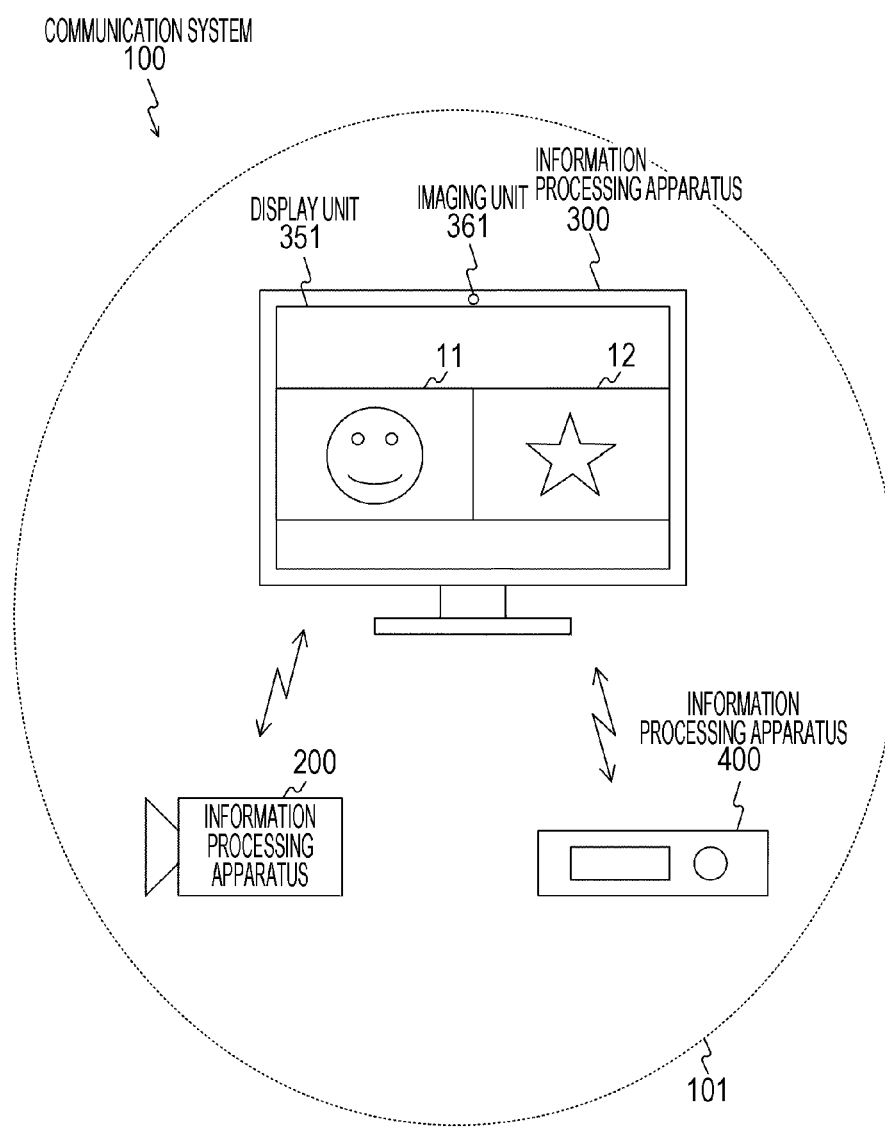
FIG. 1 is a block diagram of a system configuration example of a communication system 100 in a first embodiment of the present technology.

FIG. 1 is a block diagram of a system configuration example of a communication system 100 in a first embodiment of the present technology.

The communication system 100 includes an information processing apparatus 200, an information processing apparatus 300, and an information processing apparatus 400. The communication system 100 is a communication system in which the information processing apparatus 300 receives data (for example, image data and audio data) transmitted from at least one of the information processing apparatus 200 and the information processing apparatus 400.

The information processing apparatuses 200, 300, and 400 are transmission/reception devices with the wireless communication function. For example, the information processing apparatuses 200, 300, and 400 are display devices with the wireless communication function (for example, personal computers) or mobile information processing devices (for example, smartphones or tablet terminals). For example, the information processing apparatuses 200, 300, and 400 are wireless communication devices in conformity with IEEE (Institute of Electrical and Electronics Engineers) 802.11, 802.15, 802.16, 3GPP specifications (W-CDMA (Wideband Code Division Multiple Access), GSM (registered trademark) (Global System for Mobile Communications), LTE (Long Term Evolution), LTE-A (Advanced) and the like). The information processing apparatuses 200, 300, and 400 can exchange various kinds of information with the use of the wireless communication function.

As an example, the case of performing wireless communications between the information processing apparatus 200 and the information processing apparatus 300 or between the information processing apparatus 400 and the information processing apparatus 300 using a wireless LAN (Local Area Network) will be described.

The wireless LAN may be a Wi-Fi (Wireless Fidelity) Direct, TDLS (Tunneled Direct Link Setup), or ad-hoc network, for example. In addition, Near Field wireless AV (Audio Visual) transmission communications in the communication system 100 may be performed with the use of Wi-Fi CERTIFIED Miracast, for example. The Wi-Fi CERTIFIED Miracast is a mirroring technique for transmitting audio and display images replayed at one terminal to another terminal using Wi-Fi Direct or TDLS technique so that the audio and the image data can be output at the other terminal in the same manner.

Under the Wi-Fi CERTIFIED Miracast, UIBC (User Input Back Channel) is implemented according to the TCP/IP (Transmission Control Protocol/Internet Protocol). The UIBC is a technique for transmitting operation information on input devices such as a mouse and a keyboard from one terminal to another. Instead of the Wi-Fi CERTIFIED Miracast, other remote desktop software (for example, VNC (Virtual Network Computing)) may be used.

The Wi-Fi CERTIFIED Miracast specifies that an image (video image) is to be compressed and decompressed using H.264, for example. In addition, under the Wi-Fi CERTIFIED Miracast, H.264 can be adjusted at the transmission side. The Wi-Fi CERTIFIED Miracast supports not only H.264 but also various other codecs such as H.265 (for example, HEVC (high efficiency video coding), SHVC (scalable video coding extensions of high efficiency video coding)), MPEG (Moving Picture Experts Group) 4, JPEG (Joint Photographic Experts Group) 2000, and a line base codec.

In the first embodiment of the present technology, the information processing apparatus 200 transmits image data and audio data generated by an imaging operation. Also in the first embodiment of the present technology, the information processing apparatus 400 transmits contents saved in a storage unit (for example, hard disc) (for example, contents composed of image data and audio data). The information processing apparatus 200 may be an electronic device equipped with a camera (for example, a personal computer, a game machine, a smartphone, or a tablet terminal). The information processing apparatus 300 may be another electronic device equipped with a display unit (for example, an imaging device, a game machine, a smartphone, or a table terminal).

For example, image data generated by an imaging operation of the information processing apparatus 200 is transmitted to the information processing apparatus 300, and an image 11 based on the image data is displayed at a display unit 351 of the information processing apparatus 300. In addition, a content saved in the storage unit (for example, a hard disc) of the information processing apparatus 400 are transmitted to the information processing apparatus 300, and an image 12 based on the content is displayed at the display unit 351 of the information processing apparatus 300.

As described above, in the first embodiment of the present technology, the information processing apparatuses 200 and 400 are set as the information processing apparatuses at the source side (source devices), and the information processing apparatus 300 as the information processing apparatus at the sink side (sink device).

Referring to FIG. 1, the range of direct communications covered by the information processing apparatus 300 through wireless communications (information transmission range (service coverage) with reference to the information processing apparatus 300) is illustrated as information transmission range 101.

[Configuration Example of Information Processing Apparatus (Source Device)]

Figure 2:
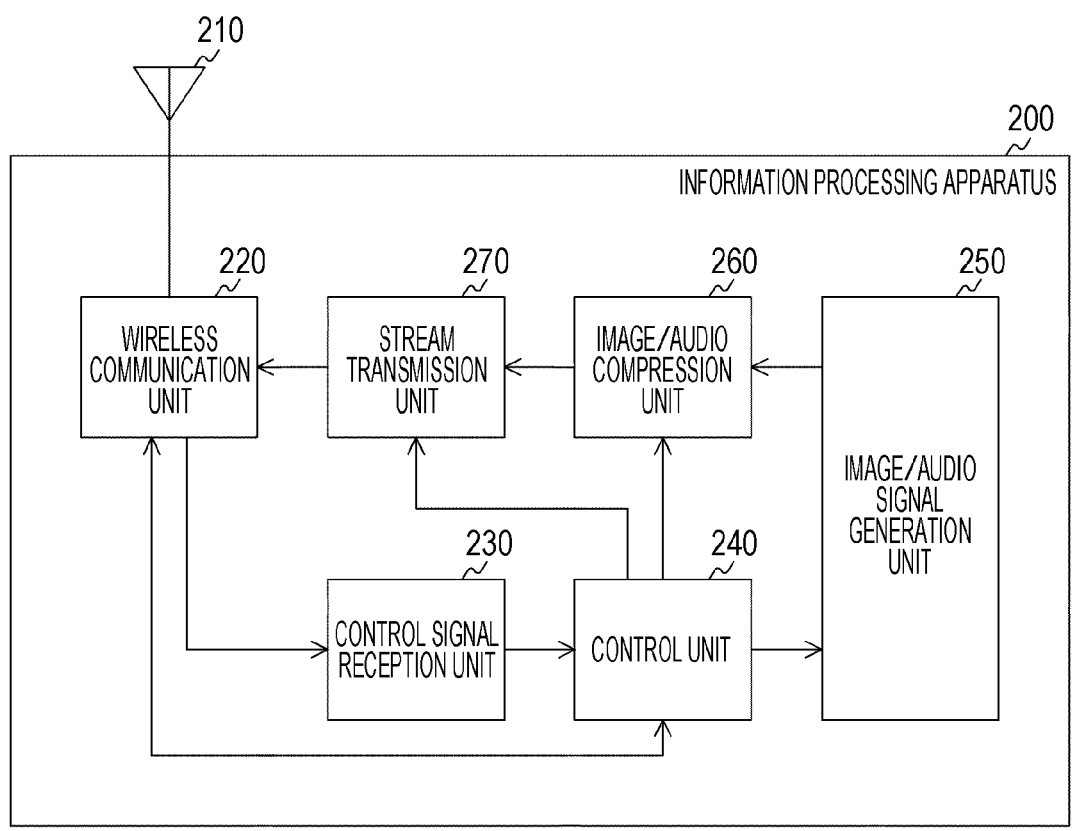
FIG. 2 is a block diagram of a functional configuration example of an information processing apparatus 200 in the first embodiment of the present technology.

FIG. 2 is a block diagram of a functional configuration example of the information processing apparatus 200 in the first embodiment of the present technology. The functional configuration of the information processing apparatus 400 relating to wireless communications is almost the same as that of the information processing apparatus 200. Accordingly, in relation to the first embodiment of the present technology, descriptions will be given only as to the information processing apparatus 200, and descriptions of the information processing apparatus 400 will be omitted.

The information processing apparatus 200 includes an antenna 210, a wireless communication unit 220, a control signal reception unit 230, a control unit 240, an image/audio signal generation unit 250, an image/audio compression unit 260, and a stream transmission unit 270.

The wireless communication unit 220 exchanges information (for example, image data and audio data) with another information processing apparatus (for example, the information processing apparatus 300) via the antenna 210 through wireless communications, under control of the control unit 240. For example, in a process for transmission of image data, the image data generated by the image/audio signal generation unit 250 is compressed by the image/audio compression unit 260, and the compressed image data (image stream) is transmitted from the antenna 210 through the wireless communication unit 220.

The wireless communication unit 220 can also exchange information with another information processing apparatus (for example, the information processing apparatus 300) using a plurality of frequency channels. In the first embodiment of the present technology, for example, the wireless communication unit 220 has the function of transmitting and receiving through three kinds of frequency channels of 2.4 GHz, 5 GHz, and 60 GHz. When the source devices have the function of transmitting and receiving through the plurality of frequency channels as described above, the sink device (for example, the information processing apparatus 300) can control on which of the frequency channels is to be used by each of the source devices.

The control signal reception unit 230 acquires, out of the information received by the wireless communication unit 220, a control signal (for example, information of exchange with the information processing apparatus 300) transmitted from another information processing apparatus (for example, the information processing apparatus 300), and outputs the acquired control signal to the control unit 240.

The control unit 240 performs a control on the information transmitted from the information processing apparatus 200. For example, the control unit 240 performs a control on the image/audio signal generation unit 250 and the image/audio compression unit 260 according to the control signal received by the control signal reception unit 230. For example, the control unit 240 performs a control for changing the resolution of image data to be transmitted or the number of channels of audio to be transmitted, or a control for changing the image area of the image data to be transmitted. That is, the control unit 240 performs a data transmission rate control on streams to be transmitted according to the control signal received by the control signal reception unit 230.

The control unit 240 also has the function of measuring radio propagation status (link radio propagation status) during exchange of data with the sink device through wireless communications. The control unit 240 may transmit the measurement results (radio propagation measurement information) to the sink device.

The radio propagation measurement information is information for use in determining whether the quality of a line to the sink device is sufficient for transmission/reception of image data and audio data. The radio propagation measurement information is also used for the data transmission rate control on streams, for example. The radio propagation measurement information will be described below in detail with reference to FIG. 4.

The data transmission rate here refers to mainly the occupancy rate of a communication path, and also means the communication speed and the communication capacity. The resolution here is defined as an index of image quality including factors such as the image frame (the numbers of vertical and horizontal pixels) of image data and the bit rate (compression ratio) of image data. The index of image quality may be a throughput of streams. The number of channels for audio also means the audio recording/replaying methods such as monaural (1.0 ch) and stereo (2.0 ch). The number of channels for audio is also defined as an index of audio quality including factors such as the bit rate (compression ratio) of audio data and the number of channels. The index of audio quality may be a throughput of streams.

The control unit 240 also performs a control for improving the state incapable of being stabled under a data rate control. For example, the control unit 240 acquires system performance information on the sink device (for example, the information processing apparatus 300) through exchange of information with the sink device. The system performance information here refers to system performance information on the sink device, for example. The system performance information includes, for example, usable frequency channels, resolution, TCP (Transmission Control Protocol), and UDP (User Datagram Protocol). The system performance information is information on support for a ciphering method, support for SD/HD, and support for the low-power consumption mode. For example, the control unit 240 can select a data transmission rate control method for further improvement of the stability of the entire communication system 100, depending on whether the sink device supports the low-power consumption mode.

For example, the control unit 240 includes the information on whether the information processing apparatus 200 is a mobile device in the information to be exchanged with the information processing apparatus 300. For example, the capability information on the information processing apparatus 200 may include the information on whether the information processing apparatus 200 is a mobile device. When recognizing that the information processing apparatus 200 is a mobile device, the information processing apparatus 300 can determine that it is not necessary to operate the information processing apparatus 200 in relation to another information processing apparatus connected to the information processing apparatus 300. As described above, when the information processing apparatus 300 determines that the information processing apparatus 200 does not need to be operated, the information processing apparatus 200 receives a transmission stop command from the information processing apparatus 300. Then, upon receipt of the transmission stop command, the control unit 240 can power off each of the functions of image/audio signal generation unit 250, the image/audio compression unit 260, and the stream transmission unit 270 for a certain period of time. The control unit 240 also can cause the wireless communication unit 220 to move to an intermittent reception mode (in which only the wireless communication unit 220 is regularly activated to receive commands from the information processing apparatus 300 and the other functions are powered off).

The image/audio signal generation unit 250 generates data to be output (image data and audio data) and outputs the generated data to the image/audio compression unit 260 under control of the control unit 240. For example, the image/audio signal generation unit 250 includes an imaging unit (not illustrated) and an audio acquisition unit (not illustrated). The imaging unit (for example, a lens, an imaging element, or a signal processing circuit) shots a subject and generates an image of the subject (image data). The audio acquisition unit (for example, a microphone) acquires surrounding sounds at the time of generation of the image data. The thus generated data is to be transmitted to another information processing apparatus (for example, the information processing apparatus 300).

The image/audio compression unit 260 compresses (encodes) the data (image data and audio data) generated by the image/audio signal generation unit 250 under control of the control unit 240. The image/audio compression unit 260 then outputs the compressed data (image data and audio data) to the stream transmission unit 270. The image/audio compression unit 260 may be implemented by execution of encoding by software or by execution of encoding by hardware.

The stream transmission unit 270 performs a transmission process for transmitting the data (image data and audio data) compressed by the image/audio compression unit 260 as streams from the antenna 210 through the wireless communication unit 220 under control of the control unit 240.

The information processing apparatus 200 may include a display unit, an audio output unit, an operation acceptance unit, or the like, as well as the components described above. However, FIG. 2 does not illustrate these units. In this example, the information processing apparatus 200 generates image data and audio data to be transmitted, but the information processing apparatus 200 may acquire image data and audio data to be transmitted from an external device. For example, the information processing apparatus 200 may acquire image data and audio data to be transmitted, from a web camera with a microphone. Alternatively, the information processing apparatus 200 may set contents (for example, contents composed of image data and audio data) saved in a storage device (for example, a hard disc) to be transmitted.

The display unit (not illustrated) of the information processing apparatus 200 is a display unit that displays the image generated by the image/audio signal generation unit 250, for example. The display unit may be a display panel such as an organic EL (electro luminescence) or an LCD (liquid crystal display).

The audio output unit (not illustrated) of the information processing apparatus 200 is an audio output unit (for example, a speaker) that outputs audio generated by the image/audio signal generation unit 250. The image may be output from both of a transmission device and a reception device, but the audio is preferably output from only either of the two.

The operation acceptance unit (not illustrated) of the information processing apparatus 200 is an operation acceptance unit that accepts an operation performed by the user. The operation acceptance unit is a keyboard, a mouse, a game pad, a touch panel, a camera, or a microphone, for example. The operation acceptance unit and the display unit may be integrated into a touch panel allowing the user to perform an operation by touching the display surface by a finger or approaching to the display surface.

[Configuration Example of Information Processing Apparatus (Reception Side)]

Figure 3:
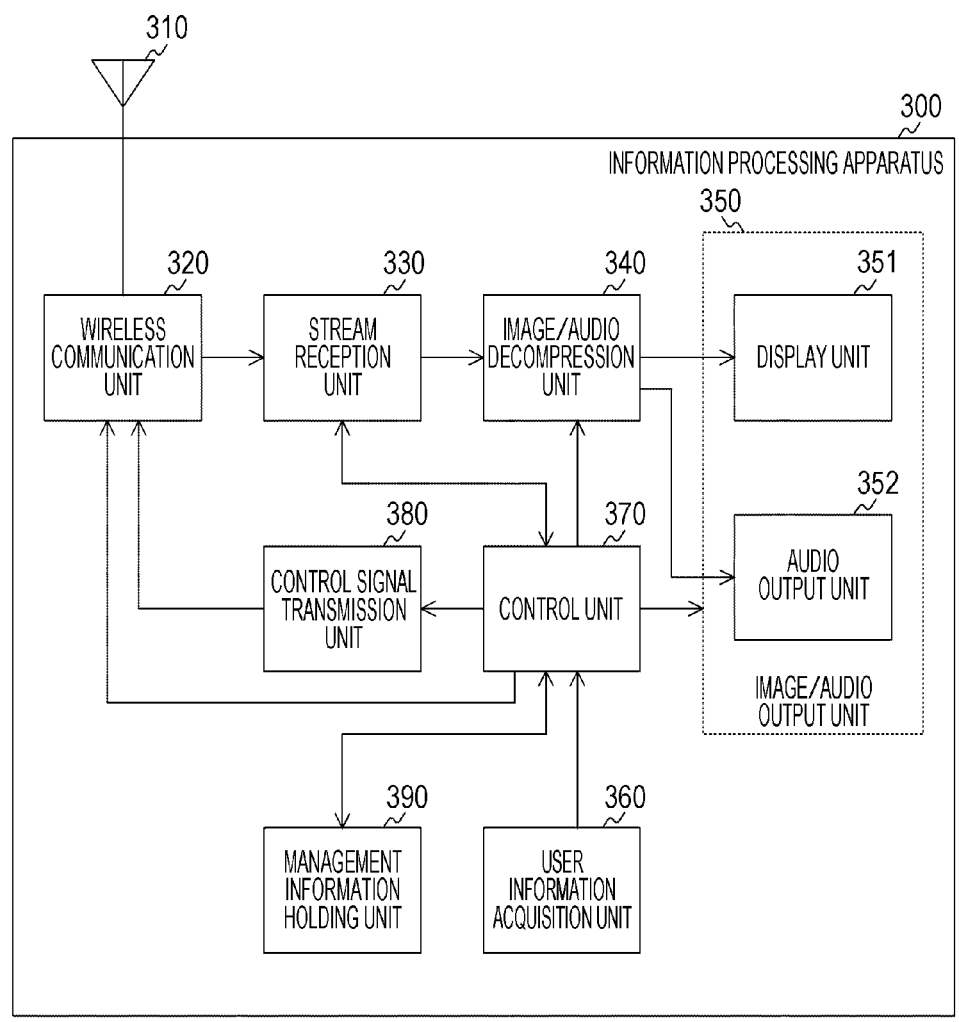
FIG. 3 is a block diagram of a functional configuration example of an information processing apparatus 300 in the embodiment of the present technology.

FIG. 3 is a block diagram of a functional configuration example of the information processing apparatus 300 in the embodiment of the present technology.

The information processing apparatus 300 includes an antenna 310, a wireless communication unit 320, a stream reception unit 330, an image/audio decompression unit 340, an image/audio output unit 350, a user information acquisition unit 360, a control unit 370, a control signal transmission unit 380, and a management information holding unit 390.

The wireless communication unit 320 exchanges information (for example, image data and audio data) with another information processing apparatus (for example, the information processing apparatus 200) via the antenna 310 through wireless communications under control of the control unit 370. For example, in a process for receiving image data, the image data received by the antenna 310 is decompressed (decoded) by the image/audio decompression unit 340 through the wireless communication unit 320 and the stream reception unit 330. Then, the decompressed image data is supplied to the image/audio output unit 350, and the image corresponding to the decompressed image data is output from the image/audio output unit 350. That is, the image corresponding to the decompressed image data is displayed at the display unit 351.

The wireless communication unit 320 can exchange information with another information processing apparatus (for example, the information processing apparatus 200) using a plurality of frequency channels. In the first embodiment of the present technology, the wireless communication unit 320 has the function of transmitting and receiving through three kinds of frequency channels of 2.4 GHz, 5 GHz, and 60 GHz. That is, the wireless communication unit 320 can perform communications in a first frequency band and communications in a second frequency band at a data transmission rate higher than the first frequency band. The control unit 370 performs a control on which of the plurality of frequency channels is to be used for wireless communications with each of the source devices.

The link between the information processing apparatus 200 and the information processing apparatus 300 and the link between the information processing apparatus 400 and the information processing apparatus 300 may be set as the same frequency channel or may be set as different frequency channels.

In the first embodiment of the present technology, the wireless communication unit 320 has the function of transmitting and receiving through the three kinds of frequency channels of 2.4 GHz, 5 GHz, and 60 GHz. However, the present technology is not limited to this. For example, the wireless communication unit 320 may have the function of transmitting and receiving through another frequency channel, or two or four or more frequency channels.

The stream reception unit 330 receives, out of the information received by the wireless communication unit 320, the information of exchange with each of the source devices and streams (for example, image stream and audio stream) under control of the control unit 370. The stream reception unit 330 then outputs the received command information to the control unit 370, and outputs the received streams to the image/audio decompression unit 340 and the control unit 370.

The information of exchange with each of the source device here refers to information transmitted from the source device (for example, the information processing apparatus 200), and includes a request for acquiring the system performance information on the information processing apparatus 300. The system performance information here refers to, for example, usable frequency channels, resolution, TCP, UDP, support for a ciphering method, support for SD/HD, and support for the low-power consumption mode.

The stream reception unit 330 has the function of measuring the radio propagation status (link radio propagation status) during exchange of data with the sink device through wireless communications. The stream reception unit 330 outputs the measurement results (radio propagation measurement information) to the control unit 370. The radio propagation measurement information will be described below in detail with reference to FIG. 4.

The image/audio decompression unit 340 decompresses (decodes) streams (image data and audio data) transmitted from another information processing apparatus (for example, the information processing apparatus 200) under control of the control unit 370. The image/audio decompression unit 340 then outputs the decompressed data (image data and audio data) to the image/audio output unit 350. The image/audio decompression unit 340 may be implemented by execution of decoding by software or by execution of decoding by hardware.

The image/audio output unit 350 includes the display unit 351 and an audio output unit 352.

The display unit 351 is a display unit that displays images (images 11 and 12 illustrated in FIG. 1) based on the image data decompressed by the image/audio decompression unit 340. The display unit 351 may be a display panel such as an organic EL panel or an LCD panel. Alternatively, the display unit 351 may be a touch panel allowing the user to perform an operation by touching the display surface by a finger or approaching the display surface.

The audio output unit 352 is an audio output unit (for example, a speaker) that outputs various kinds of audio (audio relating to the image displayed at the display unit 351 and the like) based on the audio data decompressed by the image/audio decompression unit 340. In a method for outputting audio, for example, only audio from the source device assigned to the main image may be replayed through the speaker and audio from the source device assigned to the sub image may not be replayed. In another method for outputting audio, for example, the audio may be replayed such that the volume of audio from the source device assigned to the main image is set as main volume, and the volume of audio from the source device assigned to the sub image is lowered. Alternatively, any other method for outputting audio may be used instead.

The user information acquisition unit 360 acquires information on the user (user information) and outputs the acquired user information to the control unit 370. For example, the user information acquisition unit 360 can acquire the user information by accepting inputs into the operation acceptance unit (keyboard, mouse, remote controller, game pad, or touch panel) at which the user can set directly the display method. The operation acceptance unit is an operation member for specifying any area in the image displayed at the display unit 351, for example. The user information acquisition unit 360 can also acquire the user information by accepting input from a device that can recognize the user's intention, such as a camera, a microphone, or various sensors (for example, gyro sensor or human-detecting sensor), for example.

For example, the user information acquisition unit 360 acquires the user information generated by the user's action while the image/audio output unit 350 outputs the information based on the streams received from another information processing apparatus (for example, the information processing apparatus 200) through wireless communications. The user information is user information generated by the user's action relating to the image displayed at the display unit 351, for example. The user information is information generated according to the user's operation relating to the image displayed at the display unit 351, for example.

The control unit 370 causes the management information holding unit 390 to hold the information acquired by the stream reception unit 330 and manages each of the source devices according to management information held by the management information holding unit 390. The control unit 370 performs a data transmission rate control on streams transmitted from a plurality of source devices to improve the stability of the entire system.

For example, the control unit 370 performs a data transmission rate control according to the user information acquired by the user information acquisition unit 360 and the management information held by the management information holding unit 390. Specifically, the control unit 370 generates a control signal for the data transmission rate control on streams for each of the source devices, according to the management information held by the management information holding unit 390, and outputs the generated control signal to the control signal transmission unit 380. For example, the control unit 370 changes the resolution for the image displayed at the display unit 351, and generates a control signal for making a request to each of the source devices for the transmission rate equivalent to the resolution, according to the user information and the management information. For example, the control unit 370 also generates a control signal for changing the display area of the image at the display unit 351, according to the user information and the management information. For example, the control unit 370 also generates a control signal for changing the size of the image at the display unit 351, according to the user information and the management information.

The control unit 370 also performs a control for setting the frequency channel and the resolution according to the user information and the management information. For example, the control unit 370 sets the frequency channel for each of the source devices, from among the plurality of frequency channels included in the wireless communication unit 320. When different power consumption modes are used at the frequency channels, the control unit 370 recognizes each of the modes and sets the frequency channel with consideration given to the power consumption of the mobile device. Specifically, the control unit 370 can set separately a first power consumption mode relating to the first frequency band and a second power consumption mode relating to the second frequency band at a data transmission rate higher than that in the first frequency band.

The control signal transmission unit 380 performs a process for transmitting a control signal output from the control unit 370 to another wireless communication apparatus via the wireless communication unit 320 and the antenna 310.

The management information holding unit 390 is a table that holds information (management information) for managing each of the source devices connected to the information processing apparatus 300 through wireless communications. The contents held by the management information holding unit 390 will be described below in detail with reference to FIG. 4.

[Example of Contents Held by Management Information Holding Unit]

FIG. 4 is a schematic diagram illustrating an example of contents held by the management information holding unit 390 in the first embodiment of the present technology.

The management information holding unit 390 is a table that holds information (management information) for managing each of the source devices connected to the information processing apparatus 300 through wireless communications. For example, the management information holding unit 390 holds terminal identification information 391, frequency channel 392, radio propagation measurement information 393, device information 394, bandusage level 395, output form 396, standby/wakeup 397, which are associated with one another.

The terminal identification information 391 includes identification information for identifying source devices connected to the information processing apparatus 300 through wireless communications.

The frequency channel 392 includes frequency channels actually used by the source devices connected to the information processing apparatus 300 through wireless communications.

The radio propagation measurement information 393 includes radio propagation measurement information relating to the source devices connected to the information processing apparatus 300 through wireless communications. The radio propagation measurement information is obtained by the stream reception unit 330 measuring radio propagation for each of the source devices connected to the information processing apparatus 300 through wireless communications.

The radio propagation measurement information 393 includes PER (Packet Error Rate), BER (Bit Error Rate), the number of packets retransmissions, and throughput, for example. The radio propagation measurement information 393 also includes dropping frame, SIR (Signal to Interference Ratio), and RSSI (Received Signal Strength Indicator), for example. In this example, SINR (Signal to Interference plus Noise Ratio) may be used instead of SIR. The radio propagation measurement information 393 described in FIG. 4 is a mere example, and the radio propagation measurement information 393 may include at least one of these information items or include other radio propagation measurement information obtained through measurement by the stream reception unit 330. The radio propagation measurement information 393 may include radio propagation measurement information obtained through measurement by the source device. In addition, packet delay at the reception side may be determined and the information on the packet delay may be used as radio propagation measurement information. The packet delay constitutes an index of radio propagation because, at occurrence of an error, a delay occurs in packet transmission to the reception side due to a retransmission process in layer 2, for example. The packet delay also constitutes an index for determining which of link characteristics becomes degraded in a wireless system in which a wireless band is shared among a plurality of apparatuses, for example.

The device information 394 includes the types of the source devices (attributes of the source devices) connected to the information processing apparatus 300 through wireless communications. For example, the types of the source devices are mobile device and stationary device. The types of the source devices may also be device with a power cord and other devices. Alternatively, the types of the source devices may be battery-driven device and other devices.

The band usage level 395 includes band usage levels of the source devices connected to the information processing apparatus 300 through wireless communications. The band usage levels may be resolution or throughput, for example. The band usage levels may also include throughputs in use, and a predetermined table may be prepared so that the numbers indicative of applicable ranges for the throughputs are stored and managed in the table.

The output form 396 includes the output forms of data based on streams transmitted from the source devices connected to the information processing apparatus 300 through wireless communications. For example, the output form 396 includes the display forms (main image and sub image) of the image data based on the streams transmitted from the source devices at the display unit 351. For example, the output form 396 includes the output forms (main audio and sub audio) from the audio output unit 352 of audio data based on the streams transmitted from the source devices. The display forms may include the form in which no sub image is displayed.

The standby/wakeup 397 includes the modes (standby mode and wakeup mode) of the source devices connected to the information processing apparatus 300 through wireless communications. The standby mode and the wakeup mode will be described below in detail with reference to FIGS. 6 to 8.

As described above, the management information held by the management information holding unit 390 is information for managing the identification information (terminal identification information 391) for identifying other information processing apparatuses and the capability information on other information processing apparatuses in association with each other. In addition, the management information held by the management information holding unit 390 includes at least the information on radio propagation measurement (radio propagation measurement information 393) relating to communications with other information processing apparatuses and the information on power consumption (standby/wakeup 397), as the capability information on other information processing apparatuses. Further, the management information held by the management information holding unit 390 also includes at least the information on the output form for displaying image information (output form 396) as the capability information on other information processing apparatuses. The information on the output form is information indicative of whether the image information is to be on main display or sub display, for example.

[Example of Image Transition]

FIG. 5 is a diagram illustrating an example of transition of images displayed at the display unit 351 of the information processing apparatus 300 in the first embodiment of the present technology.

FIG. 5a illustrates an example of a display form in which the image 11 is set as a main image and the image 12 as a sub image, and the images 11 and 12 are displayed at the display unit 351 of the information processing apparatus 300.

FIG. 5b illustrates an example of a display form in which the image 11 is set as a sub image and the image 12 as a main image, and the images 11 and 12 are displayed at the display unit 351 of the information processing apparatus 300.

For example, each of the information processing apparatus 200 and the information processing apparatus 400 transmits streams (image data and audio data) at a standard resolution to the information processing apparatus 300. In this case, as illustrated in FIG. 1, the image 11 based on the image data from the information processing apparatus 200 and the image 12 based on the image data from the information processing apparatus 400 may be displayed in the same size at the display unit 351 of the information processing apparatus 300. In this example, the given resolutions and display areas are defined as the same between the images 11 and 12. Alternatively, the display unit 351 may have a scaler function such that the images 11 and 12 can be re-scaled and displayed at the display unit 351. In the embodiment of the present technology, however, this function is not used for simplification of the description.

For the display forms of the images 11 and 12, for example, the display forms set at the time of the previous communications may be held so that the images 11 and 12 are displayed in those display forms at the display unit 351 of the information processing apparatus 300.

Alternatively, the display forms of the images 11 and 12 may be decided according to the order of connection to the information processing apparatus 300. For example, the information processing apparatus 200 is first connected to the information processing apparatus 300, and then the information processing apparatus 400 is connected to the information processing apparatus 300. In this case, the image 11 as a main image and the image 12 as a sub image are displayed at the display unit 351 of the information processing apparatus 300. Specifically, the main image and the sub image may be displayed in this order according to the order of connection to the information processing apparatus 300.

As illustrated in FIG. 5a, when the image 11 as a main image and the image 12 as a sub image are displayed at the display unit 351, the user information acquisition unit 360 may acquire user information indicating that the image 12 is a main image. For example, when the viewer performs an operation for setting the image 12 as a main image with the use of a remote controller or a pointer as a gesture, the user information acquisition unit 360 acquires the user information indicating that the image 12 is a main image. In this case, as illustrated in FIG. 5b, the image 11 as a sub image and the image 12 as a main image are displayed at the display unit 351. The display positions of the images 11 and 12 on the display surface of the display unit 351 are also decided according to the user information acquired by the user information acquisition unit 360 (for example, the user's manual operation or line of sight).

Communication Example

Figure 6:
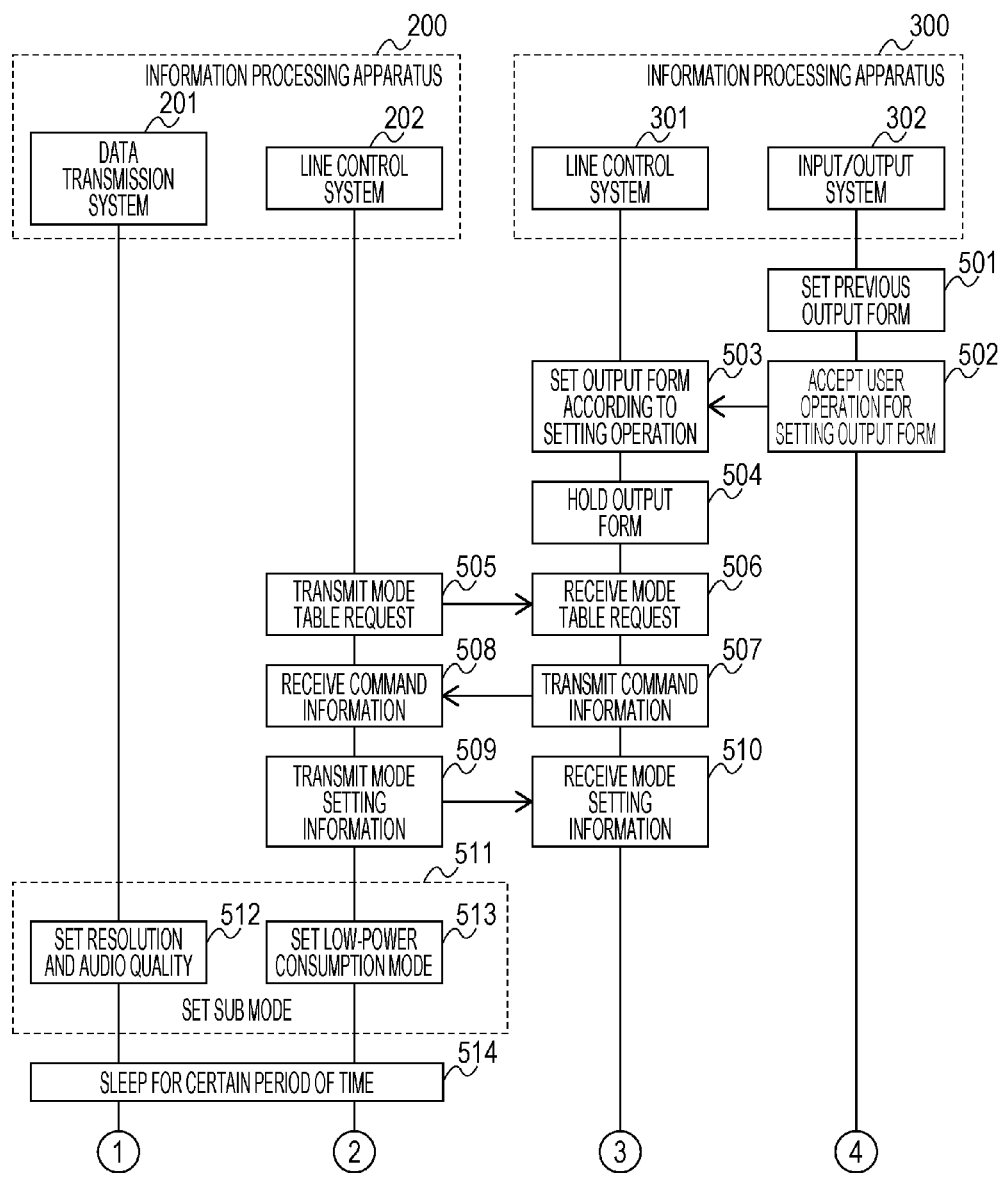
FIG. 6 is a sequence chart of a communication process example between the apparatuses constituting the communication system 100 in the first embodiment of the present technology.
Figure 7:
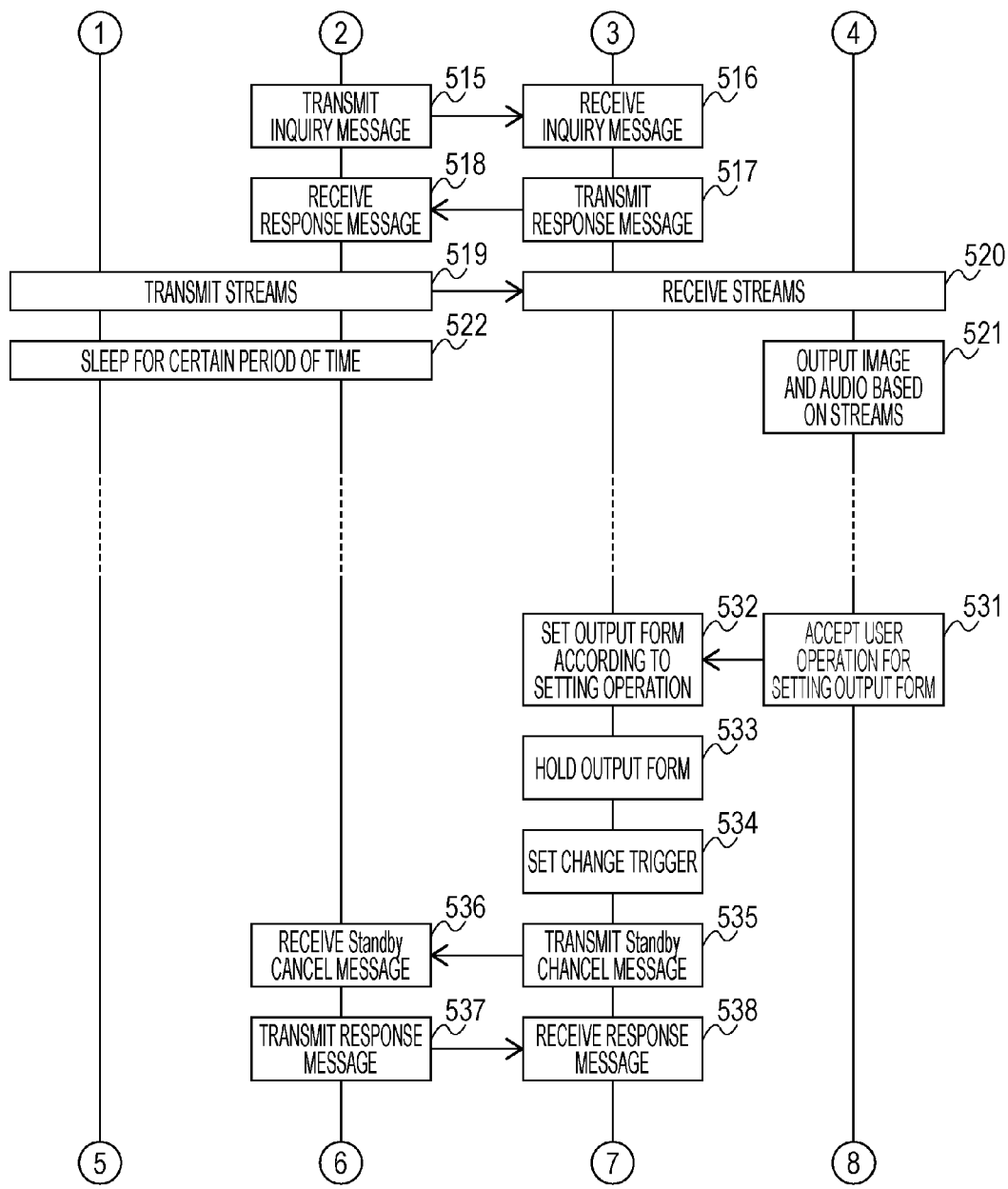
FIG. 7 is a sequence chart of a communication process example between the apparatuses constituting the communication system 100 in the first embodiment of the present technology.
Figure 8:
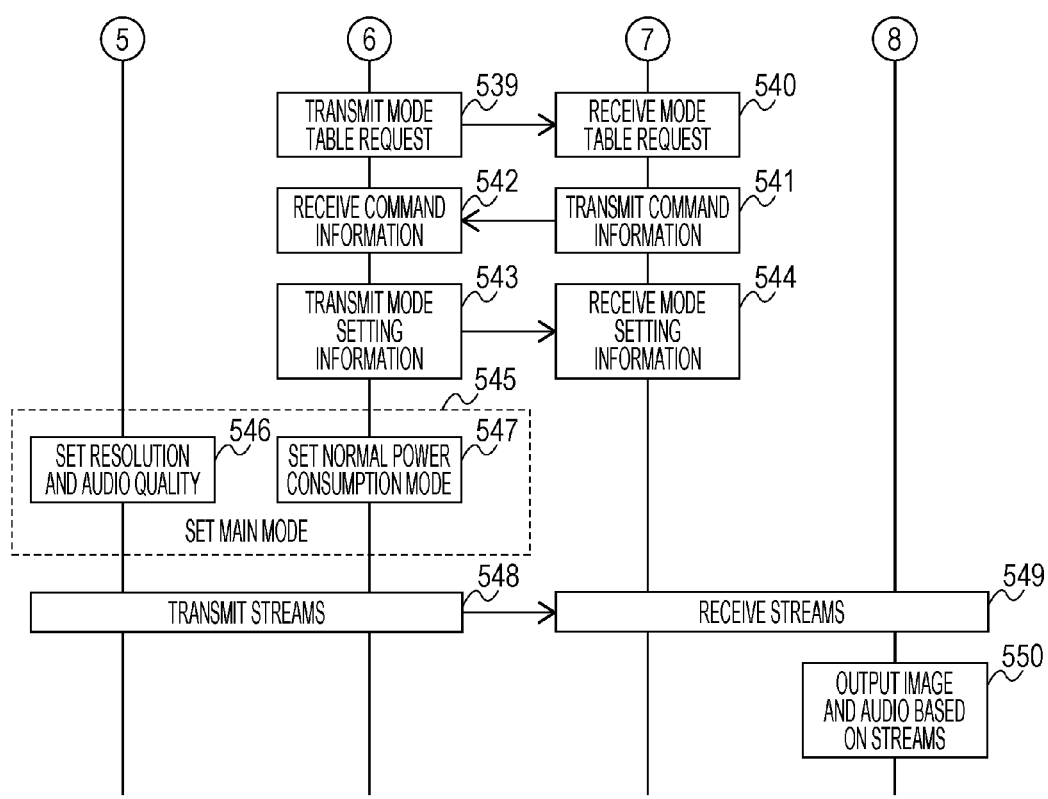
FIG. 8 is a sequence chart of a communication process example between the apparatuses constituting the communication system 100 in the first embodiment of the present technology.

FIGS. 6 to 8 form a sequence chart of a communication process example at the apparatuses constituting the communication system 100 in the first embodiment of the present technology. FIGS. 6 to 8 describe a communication process example between the information processing apparatus 200 and the information processing apparatus 300.

In FIGS. 6 to 8, of the components of the information processing apparatus 200, the image/audio signal generation unit 250, the image/audio compression unit 260, and the stream transmission unit 270 are represented as a data transmission system 201. In addition, the antenna 210, the wireless communication unit 220, the control signal reception unit 230, and the control unit 240 are represented as a line control system 202.

In FIGS. 6 to 8, of the components of the information processing apparatus 300, the antenna 310, the wireless communication unit 320, the stream reception unit 330, the control unit 370, and the control signal transmission unit 380 are represented as a line control system 301. In addition, the image/audio decompression unit 340, the image/audio output unit 350, and the user information acquisition unit 360 are represented as an input/output system 302.

FIGS. 6 to 8 describe, first, an example in which an image based on image data from the information processing apparatus 200 is displayed as a sub image at the display unit 351 of the information processing apparatus 300, and the low-power consumption mode is set at the information processing apparatus 200. FIGS. 6 to 8 then describe an example in which the image based on image data from the information processing apparatus 200 is displayed as a main image at the display unit 351, and a normal power consumption mode is set at the information processing apparatus 200. That is, FIGS. 6 to 8 describe an example of connection setups of the information processing apparatus 200 and the information processing apparatus 300 and an example of power consumption mode transition at the information processing apparatus 200.

First, when the information processing apparatus 300 is powered on, as the output form (image display form and audio output form) of the information processing apparatus 300, the previous output form (output forms of the information processing apparatus 300 at the time of power-off) is set (501). The control unit 370 of the information processing apparatus 300 causes the management information holding unit 390 (illustrated in FIG. 4) to hold the management information on the source devices connected to the information processing apparatus 300 through wireless communications. The control unit 370 of the information processing apparatus 300 also displays the images 11 and 12 corresponding to two streams transmitted from the information processing apparatus 200 and the information processing apparatus 400 at the display unit 351 according to the previous output form as illustrated in FIG. 5.

Subsequently, the user performs an operation for setting (changing) the output form (502). In this case, the user information acquisition unit 360 acquires a control signal relating to the setting operation as user information, and outputs the user information to the control unit 370. Then, the control unit 370 changes the contents held by the management information holding unit 390 (illustrated in FIG. 4) according to the user information (503 and 504). For example, as illustrated in FIG. 5b, the user performs an operation for setting (changing) the image 11 based on the image data from the information processing apparatus 200 as a sub image. In this case, the control unit 370 changes the output form 396 (illustrated in FIG. 4) of the information processing apparatus 200 in the management information holding unit 390 to "sub" (503 and 504).

The information processing apparatus 200 also transmits a mode table request (an inquiry request for resolution/audio quality, low-power consumption mode, or the like) to the information processing apparatus 300 on a regular or irregular basis (including only at the time of starting) (505 and 506). The mode table request is intended to request for transmission of the information managed at the information processing apparatus 300 (management information on the information processing apparatus 300 for use in communications with the information processing apparatus 200 (for example, information on the resolution at which images can be displayed at the information processing apparatus 200, and the like)).

Upon receipt of the mode table request (506), the information processing apparatus 300 transmits command information according to the mode table request (resolution/audio quality, kinds of image and audio codecs, presence or absence of 3D function, presence or absence of content protection, display size on a display device, topology information, usable protocols, setting information on these protocols (port information and the like), connection interface information (connector type and the like), positions of horizontal synchronization and vertical synchronization, information on request for source device performance priorities, mode control table response on support or non-support of the low-power consumption mode or the like, maximum transmission throughput or maximum reception throughput in wireless communications, CPU (Central Processing Unit) power, battery remaining amount, power supply information, and the like) (507 and 508). The command information is information on the information processing apparatus 200 for the information processing apparatus 300 to request for making settings of the information processing apparatus 200 with considerations given to radio propagation environments and display forms. The command information includes information on the output form such as resolution/audio quality and support or non-support of the low-power consumption mode. Each of items in the command information is included in the capability information. The information on output form such as resolution/audio quality relating to the information processing apparatus 200 indicates whether the output form of data from the information processing apparatus 200 is a main form or a sub form, for example. The information processing apparatus 300 also transmits a request for setting the resolution/audio quality and low-power consumption mode included as a parameter in the command information, from a perspective of the information processing apparatus 300. The information processing apparatus 300 may transmit the information relating to all the source devices as well as the information relating to the information processing apparatus 200, as the command information. In this case, the information processing apparatus 200 selects and uses only the information for the information processing apparatus 200. When the information processing apparatuses conform to Wi-Fi CERTIFIED Miracast, the command information corresponds to wfd-audio-codecs, wfd-video-formats, wfd-content-protection, wfd-displayedid, wfd-coupledsink, wfd-client-rtpports, wfd-I2C, wfd-uibccapability, wfd-connectortype, wfd-standby-resume-capability, and others, which are defined as RTSP messages. However, for the command information, there is no limitation on the contents of a message transmitted.

Upon reception of the command information (508), the control unit 240 of the information processing apparatus 200 determines whether the output form of data from the information processing apparatus 200 is a main form or a sub form according to the command information. The control unit 240 of the information processing apparatus 200 also determines whether the information processing apparatus 300 has the function corresponding to the power consumption modes according to the command information. Then, the control unit 240 of the information processing apparatus 200 transmits to the information processing apparatus 300 the mode setting information indicating that the specified output form will be set (509 and 510). In this example, the output form of data from the information processing apparatus 200 is determined as a sub form, and the information processing apparatus 300 has the function corresponding to the low-power consumption mode. Accordingly, the control unit 240 of the information processing apparatus 200 transmits to the information processing apparatus 300 the mode setting information for notifying that the specified output form (sub) is set and the low-power consumption mode is set (509 and 510).

In this example, the image is determined as a main image or a sub image and the low-power consumption mode is set according to the command information. Alternatively, the low-power consumption mode may be set without using the determination criterion of whether the image is a main image or a sub image. For example, the low-power consumption mode may be set through exchange of a permission flag indicating whether the shift to the low-power consumption mode is permitted between the source device and the sink device.

The control unit 240 of the information processing apparatus 200 then sets the sub mode as a transmission mode (511). Accordingly, in the data transmission system 201, the resolution for display of the sub image and the audio quality for outputting sub audio are set (512). In the line control system 202, the low-power consumption mode is set (513).

As described above, in the case of setting the low-power consumption mode, both of the sink device and the source devices need to have the function of the low-power consumption mode. In addition, for example, mobile devices (such as mobile phones, smartphones, and tablet terminals) are battery-driven in many cases. Accordingly, in the case where the output form of data from the subject device is not the main form (that is, the sub form), the battery consumption of the subject device is preferably reduced as much as possible. Thus, the low-power consumption mode is preferably set to the source device for which the output form at the sink device is set to the sub form. Further, the setting process (512) may be performed such that only audio from the source device assigned to the main image is replayed from the speaker and audio from the source device assigned to the sub image is not replayed. Otherwise, the setting process (512) may be performed such that the volume of audio from the source device assigned to the main image is set as main volume and the volume of audio from the source device assigned to the sub image is turned down and replayed.

As described above, in the case where the output form for a sub image is set (sub display), the control unit 370 of the information processing apparatus 300 performs a control for setting the low-power consumption mode in the information processing apparatus 200. That is, the control unit 370 of the information processing apparatus 300 performs a control for setting the power consumption mode in the information processing apparatus 200 according to the output format the displayunit 351 outputting image information based on streams.

When the low-power consumption mode is set (513), the control unit 240 of the information processing apparatus 200 starts intermittent transmission (514 to 522).

Specifically, the information processing apparatus 200 stops the transmission process for a certain period of time to bring the components into the sleep state (514). Subsequently, after a lapse of the certain period of time (514), the information processing apparatus 200 wakes up the components of the information processing apparatus 200 (WakeUp) to perform the process for transmission to the information processing apparatus 300 (515 to 520).

For example, the control unit 240 of the information processing apparatus 200 transmits an inquiry message to the information processing apparatus 300 to check whether any change is made at the information processing apparatus 300 (for example, a change in the output form) (515 and 516).

Upon receipt of the inquiry message (516), the control unit 370 of the information processing apparatus 300 transmits a response message to the information processing apparatus 200 to notify whether any change (for example, a change in the output form) is made (517 and 518). In this example, no change (for example, no change in the output form) is made at the information processing apparatus 300. Accordingly, the control unit 370 of the information processing apparatus 300 transmits a response message to the information processing apparatus 200 to notify that no change (for example, no change in the output form) is made (517 and 518).

When the response message notifying that no change (for example, no change in the output form) is made (518), there is no need to make any change to settings at the information processing apparatus 200. Accordingly, the control unit 240 of the information processing apparatus 200 transmits streams for outputting the sub image and the sub audio to the information processing apparatus 300 (519 and 520). Upon receipt of the streams as described above (520), the information processing apparatus 300 outputs the image and the audio based on the received streams (521). For example, as illustrated in FIG. 5b, the image 11 based on the stream from the information processing apparatus 200 is displayed as the sub image at the display unit 351.

Upon completion of the transmission process (519), the information processing apparatus 200 stops the transmission process for a certain period of time to bring the components into the sleep state (522). In addition, intermittent transmission is continuously performed until any change request is received from the information processing apparatus 300.

During the intermittent transmission, no stream is transmitted from the information processing apparatus 200 for a period of time. Accordingly, the information processing apparatus 300 preferably performs a display process to interpolate and display the image corresponding to the stream lastly received from the information processing apparatus 200. However, the information processing apparatus 300 may has no function of interpolation. In this case, during the sleep time, the image from the information processing apparatus 200 cannot be displayed at the display unit 351. Accordingly, when the information processing apparatus 300 has no function of interpolation, the image data from the information processing apparatus 200 may be continuously transmitted. For example, out of the streams to be transmitted from the information processing apparatus 200, the image data immediately before the stoppage of the transmission is held in a transmission buffer. Then, during the sleep time, the image processing by the information processing apparatus 200 is stopped but the transmission process is continuously performed in a wireless link so that the image data held in the transmission buffer is continuously transmitted.

Alternatively, during the sleep time, only the images corresponding to the streams transmitted from the information processing apparatus 400 may be displayed at the display unit 351. For example, the images corresponding to the streams transmitted from the information processing apparatus 400 may be displayed at the entire display unit 351.

Next, the case where the user performs an operation for setting (changing) the output form will be described.

When the user performs the operation for setting (changing) the output form (531), the control unit 370 changes the contents held by the management information holding unit 390 (illustrated in FIG. 4) according to the user information relating to the setting operation, as described above (532 and 533). For example, as illustrated in FIG. 5a, the setting operation (changing operation) is performed to set the image 11 based on the image data from the information processing apparatus 200 as a main image. In this case, the control unit 370 changes the output form 396 (illustrated in FIG. 4) of the information processing apparatus 200 at the management information holding unit 390 to "main" (532 and 533).

When the low-power consumption mode is set at the information processing apparatus 200 as described above, the information processing apparatus 200 may be in the sleep state. When the information processing apparatus 200 is in the sleep state, it is not possible to notify the information processing apparatus 200 that the user has performed the operation for setting (changing) the output form.

Accordingly, when the user performs the operation for setting (changing) the output form (531) and the contents held by the management information holding unit 390 (illustrated in FIG. 4) are changed (532 and 533), the control unit 370 of the information processing apparatus 300 sets a change trigger (534). The change trigger is a trigger for, upon receipt of an inquiry message from the information processing apparatus 200, notifying the information processing apparatus 200 that the user has performed the operation for setting (changing) the output form. By using the change trigger, the information processing apparatus 200 is moved out of the standby mode and is notified that the user has performed the operation for setting (changing) the output form.

In this example, the components of the information processing apparatus 200 wake up and start the process for transmission to the information processing apparatus 300. In this case, the control unit 370 of the information processing apparatus 300 transmits a standby cancel message to the information processing apparatus 200 (535 and 536).

Upon receipt of the standby cancel message (536), the control unit 240 of the information processing apparatus 200 transmits a response message to the information processing apparatus 300 (537 and 538).

As described above, in response to the standby mode cancel request from the sink device (535 to 538), the information processing apparatus 200 needs to inquire about the setting status. Accordingly, the control unit 240 of the information processing apparatus 200 transmits a mode table request to the information processing apparatus 300 (539 and 540). The mode table request is intended to make a request for transmission of the information managed at the information processing apparatus 300 (the management information on the information processing apparatus 200) as described above. At the foregoing steps (535 to 538), messages about any change (for example, any change in the output form) (for example, the response message to the inquiry message at the steps (515 to 518) may be exchanged.

Upon receipt of the mode table request (540), the information processing apparatus 300 transmits command information according to the mode table request (541 and 542). When the command information has been already transmitted from the information processing apparatus 300 to the information processing apparatus 200, the information processing apparatus 200 has already acquired the information contained in the command information. Accordingly, in this example, the information processing apparatus 300 may transmit only differential information as the command information responsive to the mode table request (541 and 542). The differential information refers to information relating to changes, and for example, information on the output form such as resolution/audio quality at the information processing apparatus 200.

Upon receipt of the command information (542), the control unit 240 of the information processing apparatus 200 determines whether the output form of data from the information processing apparatus 200 is the main form or the sub form according to the command information. Subsequently, the control unit 240 of the information processing apparatus 200 transmits to the information processing apparatus 300 mode setting information indicating that the determined output form will be set (543 and 544). In this example, the output form of data from the information processing apparatus 200 is determined as the main form. Accordingly, the control unit 240 of the information processing apparatus 200 transmits to the information processing apparatus 300 the mode setting information to notify that the determined output form (main) is set and the normal power consumption mode is set (543 and 544). The steps (539 to 544) may be performed by Capability Re-negotiation when the apparatuses conform to Wi-Fi CERTIFIED Miracast. In the case of Capability Re-negotiation, there is no need to conduct re-negotiation on setting values with no change in the output form at the step (534). For example, wfd-displayedid, wfd-client-rtpports, wfd-I2C, wfd-connectortype, and others are applicable.

Subsequently, the control unit 240 of the information processing apparatus 200 sets the main mode as the transmission mode (545). Accordingly, in the data transmission system 201, the resolution for displaying the main image and the audio quality for outputting the main audio are set (546). In the line control system 202, the normal power consumption mode is set (547).

As described above, when the normal power consumption mode is set (547), the control unit 240 of the information processing apparatus 200 starts the normal transmission process (548 and 549). Specifically, the information processing apparatus 200 transmits streams for outputting the main image and the main audio to the information processing apparatus 300 (548 and 549). Upon receipt of the streams (549), the information processing apparatus 300 outputs the image and audio based on the received streams (550). For example, as illustrated in FIG. 5a, the image 11 based on the stream from the information processing apparatus 200 is displayed as the main image at the display unit 351.

In this example, when the information processing apparatus 300 is powered on, the display form at the display unit 351 is set to the previous output form (the output form immediately before power-off of the information processing apparatus 300). Alternatively, when the information processing apparatus 300 is powered on, another output form may be set. For example, whenever the information processing apparatus 300 is powered on, the default output form may be set. Alternatively, the display form may be set in the order of connection to the information processing apparatus 300.

Figure 9:
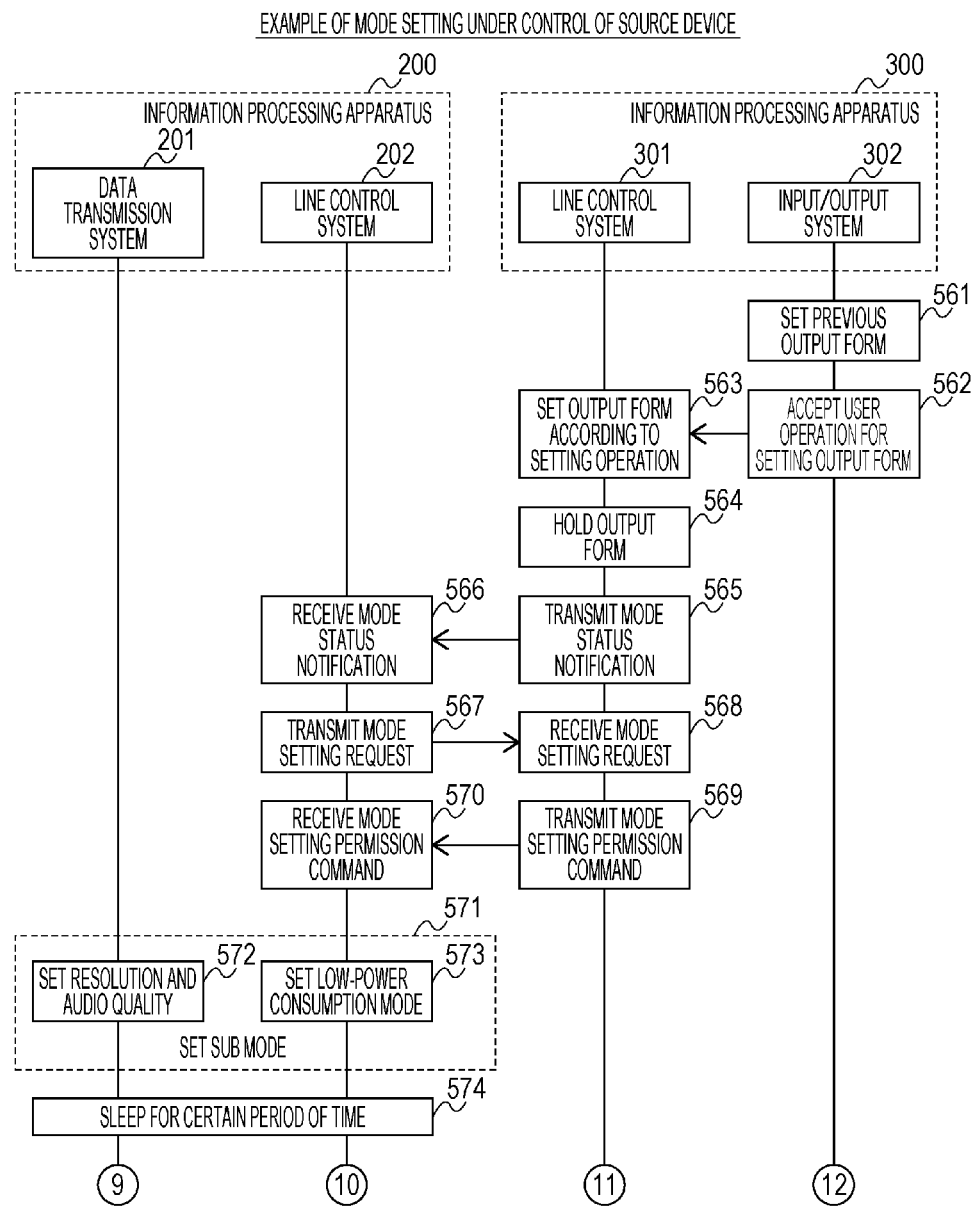
FIG. 9 is a sequence chart of a communication process example between the apparatuses constituting the communication system 100 in the first embodiment of the present technology.
Figure 10:
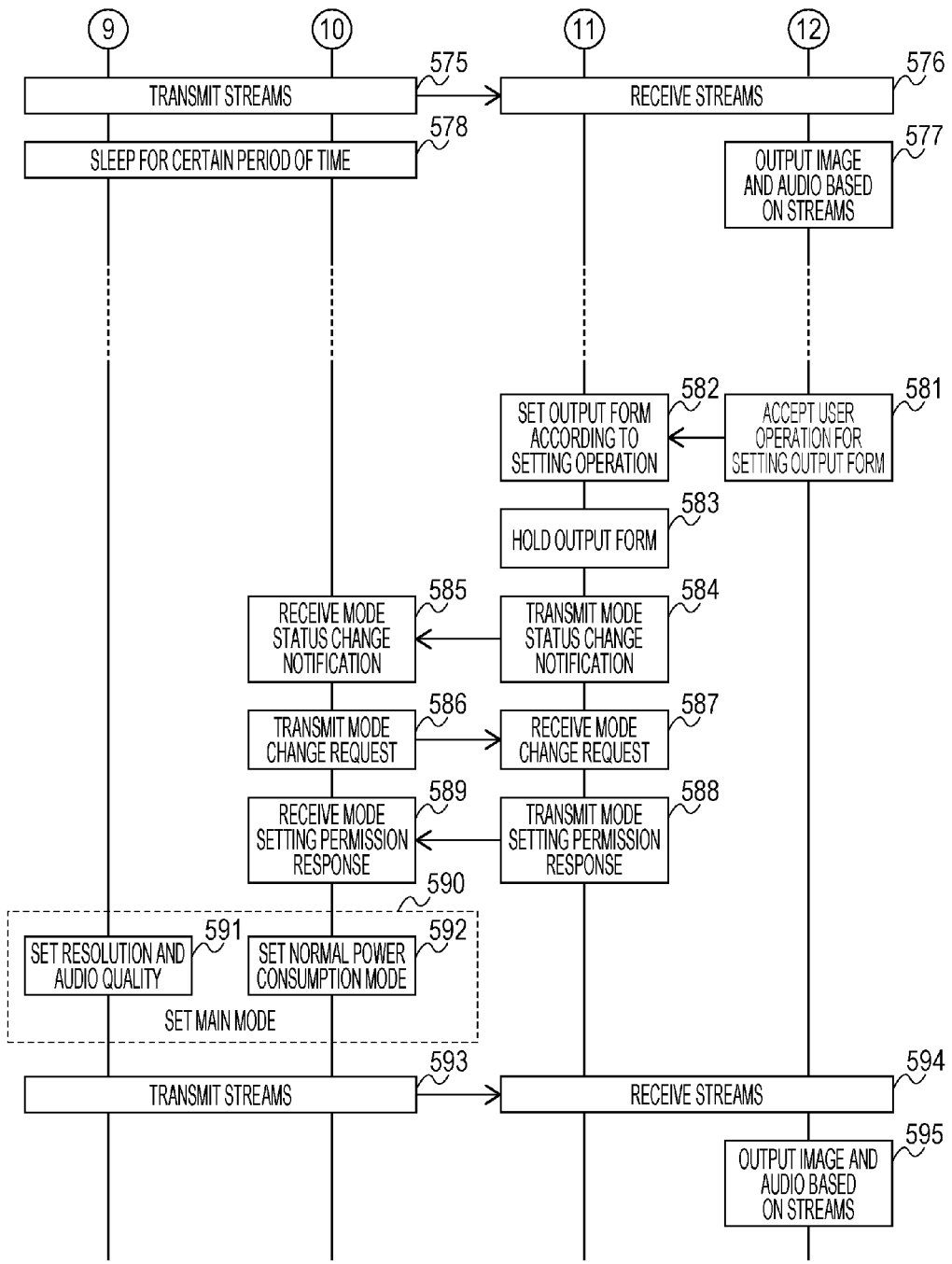
FIG. 10 is a sequence chart of a communication process example between the apparatuses constituting the communication system 100 in the first embodiment of the present technology.

FIGS. 6 to 8 illustrate the example in which the information processing apparatus 200 inquires about the setting information at the information processing apparatus 300 and sets the transmission parameter based on the received parameter information. Alternatively, the information processing apparatus 200 may make a request of the information processing apparatus 300 for the parameter to be set and, upon receipt of a positive response from the information processing apparatus 300, the information processing apparatus 200 may set the parameter. FIGS. 9 and 10 illustrate this example.

Communication Example

Figure 11:
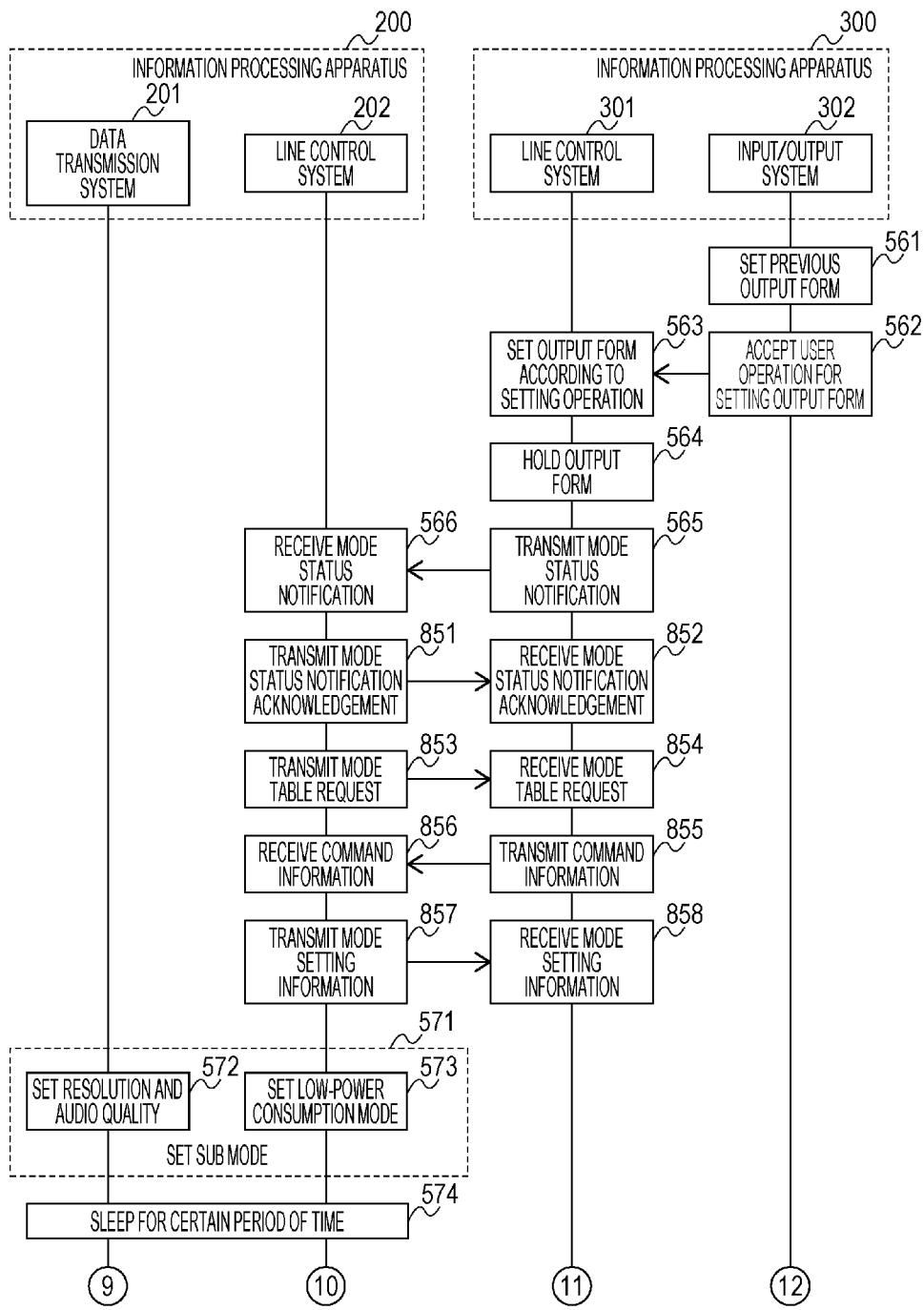
FIG. 11 is a sequence chart of a communication process example between the apparatuses constituting the communication system 100 in the first embodiment of the present technology.

FIGS. 9 to 11 provide sequence charts of communication process examples between the apparatuses constituting the communication system 100 in the first embodiment of the present technology. The communication process example described in FIGS. 9 and 10 is formed by adding some modifications to the communication process example described in FIGS. 6 to 8. Accordingly, FIGS. 9 and 10 illustrate the same components as those in the communication process example illustrated in FIGS. 6 to 8 with the same reference signs, and some of descriptions thereof will be omitted. In addition, the communication process example described in FIG. 11 is formed by adding some modifications to the communication process example described in FIG. 9. Accordingly, FIG. 11 illustrates the same components as those in the communication process example described in FIG. 9 with the same reference signs, and some of descriptions thereof will be omitted.

The steps described in FIG. 9 (561 to 564) correspond to the steps described in FIG. 6 (501 to 504).

Subsequently, the control unit 370 of the information processing apparatus 300 transmits a mode status notification to the information processing apparatus 200 to notify the output form set by the user (565 and 566). The mode status notification is information for notifying the output form set by the user (for example, main or sub form), the settings available at the information processing apparatus 200 such as resolution/audio quality, kinds of image and audio codecs, presence or absence of 3D function, presence or absence of content protection, display size on a display device, topology information, usable protocols, setting information on these protocols (port information and the like), connection interface information (connector type and the like), positions of horizontal synchronization and vertical synchronization, information on request for source device performance priorities, mode control table response on support or non-support of the low-power consumption mode or the like, maximum transmission throughput or maximum reception throughput in wireless communications, CPU power, battery remaining amount, power supply information, and others.

Immediately after the user has performed the operation for setting the output form at the information processing apparatus 300, the information processing apparatus 300 can transmit a mode status notification to the information processing apparatus 200 to notify the output form according to the setting operation. This shortens the setting time (changing time) between the information processing apparatus 200 and the information processing apparatus 300 connected through wireless communications.

Upon receipt of the mode status notification (566), the control unit 240 of the information processing apparatus 200 compares a status parameter specified by the received mode status notification to a status parameter in the subject apparatus. Subsequently, the control unit 240 of the information processing apparatus 200 decides the setting contents (for example, resolution/audio and power consumption mode) based on the comparison results. Then, the control unit 240 of the information processing apparatus 200 transmits a mode setting request to the information processing apparatus 300 to notify the decided setting contents (for example, resolution/audio and power consumption mode) (567 and 568).

Upon receipt of the mode setting request (568), the control unit 370 of the information processing apparatus 300 determines whether the setting contents (for example, resolution/audio and power consumption mode) specified by the received mode setting request are to be permitted. Then, the control unit 370 of the information processing apparatus 300 transmits a mode setting availability command to the information processing apparatus 200 to notify the determination results (569 and 570).

Upon receipt of the mode setting availability command (570), the control unit 240 of the information processing apparatus 200 checks the contents of the mode setting availability command. For example, when the received mode setting availability command indicates that the setting contents relating to the mode setting request transmitted from the information processing apparatus 200 are permitted, the control unit 240 of the information processing apparatus 200 sets the sub mode as the transmission mode (571). The steps described in FIG. 9 (571 to 574) correspond to the steps described in FIG. 6 (511 to 514). The steps described in FIG. 10 (575 to 578) correspond to the steps described in FIG. 7 (519 to 522).

When the received mode setting availability command indicates that the setting contents relating to the mode setting request transmitted from the information processing apparatus 200 is not permitted, the control unit 240 of the information processing apparatus 200 newly decides setting contents (for example, resolution/audio and power consumption mode). Then, the control unit 240 of the information processing apparatus 200 transmits to the information processing apparatus 300 a mode setting request to notify the newly decided setting contents (for example, resolution/audio and power consumption mode).

The steps described in FIG. 10 (581 to 583) correspond to the steps described in FIG. 7 (531 to 533).

Subsequently, the control unit 370 of the information processing apparatus 300 transmits to the information processing apparatus 200 a mode status change notification to notify the output form changed by the user (584 and 585). The mode status change notification is information for notifying the output form changed by the user (for example, main form or sub form), resolution/audio quality settable at the information processing apparatus 200, support or non-support of the low-power consumption mode, and the like.

Upon receipt of the mode status change notification (585), the control unit 240 of the information processing apparatus 200 decides the setting contents (for example, resolution/audio and power consumption mode). The process for deciding the setting contents is the same as the process described above. Then, the control unit 240 of the information processing apparatus 200 transmits to the information processing apparatus 300 a mode change request for notifying the decided setting contents (for example, resolution/audio and power consumption mode) (586 and 587).

Upon receipt of the mode change request (587), the control unit 370 of the information processing apparatus 300 determines whether the setting contents (for example, resolution/audio and power consumption mode) specified by the received mode change request are to be permitted. Then, the control unit 370 of the information processing apparatus 300 transmits to the information processing apparatus 200 a mode setting availability command for notifying the determination results (588 and 589).

Upon receipt of the mode setting availability command (589), the control unit 240 of the information processing apparatus 200 checks the contents of the mode setting availability command and sets the transmission mode (590). The checking process here is the same as the checking process described above. The steps described in FIG. 10 (590 to 595) correspond to the steps described in FIG. 8 (545 to 550).

In this example, when switchover takes place between the sub image and the main image, the information indicating the timing for the switching (for example, the information indicating the beginning of GOP (Group of Picture) or the information indicating the beginning of Picture) may be included in the stream to be transmitted. In other words, at the time of switchover between main display and sub display, the source device may transmit to the sink device the information indicating the timing for the switchover. In this case, the sink device having received the stream can switch between the sub image and the main image at the appropriate timing according to the information indicating the timing.

FIGS. 6 to 10 describe an example of a control on the standby and wakeup states of the source devices connected to the sink device. Alternatively, the standby and wakeup states of the sink device may be controlled based on the standby and wakeup states of the source devices connected to the sink device. For example, the sink device may be controlled to enter the standby state when all of the source devices connected to the sink device have entered the standby state. The sink device may be controlled to enter the wakeup state when at least one of the source devices connected to the sink device is in the wakeup state.

FIG. 11 describes a modification example of a control in which, at the steps described in FIG. 9 (565 to 570), the sink device notifies the source devices that the held contents were changed at step (564), and the source devices transmit a mode table request.

As described in FIG. 11, the information processing apparatus 300 notifies the information processing apparatus 200 of the change of the output form (564) and transmits a mode status notification to the information processing apparatus 200 to prompt the information processing apparatus 200 for transmission of a mode setting request (565 and 566). Upon receipt of the mode status notification, the information processing apparatus 200, when possible, transmits to the information processing apparatus 300 a mode status notification acknowledgement indicating that the mode status notification is acknowledged (851 and 852).

After the transmission of the mode status notification acknowledgement (851) as described above, several steps are performed (853 to 858). The steps (853 to 858) correspond to the steps described in FIG. 6 (505 to 510). By performing the steps (853 to 858) after the transmission of the mode status notification acknowledgement (851), the data transmission rate control can be appropriately performed in response to the status change (change of the output form (564)).

In this example, out of the commands prepared in Wi-Fi CERTIFIED Miracast, RTSPM5 message including wfd-triggered-method is currently defined as a command to be transmitted from the information processing apparatus 200 to the information processing apparatus 300. Alternatively, when RTSPM5 message including wfd-triggered-method can be extended to a command to be transmitted from the information processing apparatus 300 to the information processing apparatus 200, the information processing apparatus 200 can receive RTSPM5 message including wfd-triggered-method and start Capability Re-negotiation with the information processing apparatus 300. That is, the information processing apparatus 200 and the information processing apparatus 300 can exchange the management information by the use of RTSPM5 messages including wfd-triggered-method. For example, the control unit 370 of the information processing apparatus 300 may perform a control for, when any change is made to the management information, transmitting RTSPM5 message including wfd-triggered-method set forth in Wi-Fi CERTIFIED Miracast specifications as a command to the information processing apparatus 200 for notifying the information processing apparatus 200 of the change to the management information. Alternatively, new commands may be defined instead of these commands to produce the equivalent effects.

[Operation Example of Information Processing Apparatus (Source Device)]

Figure 12:
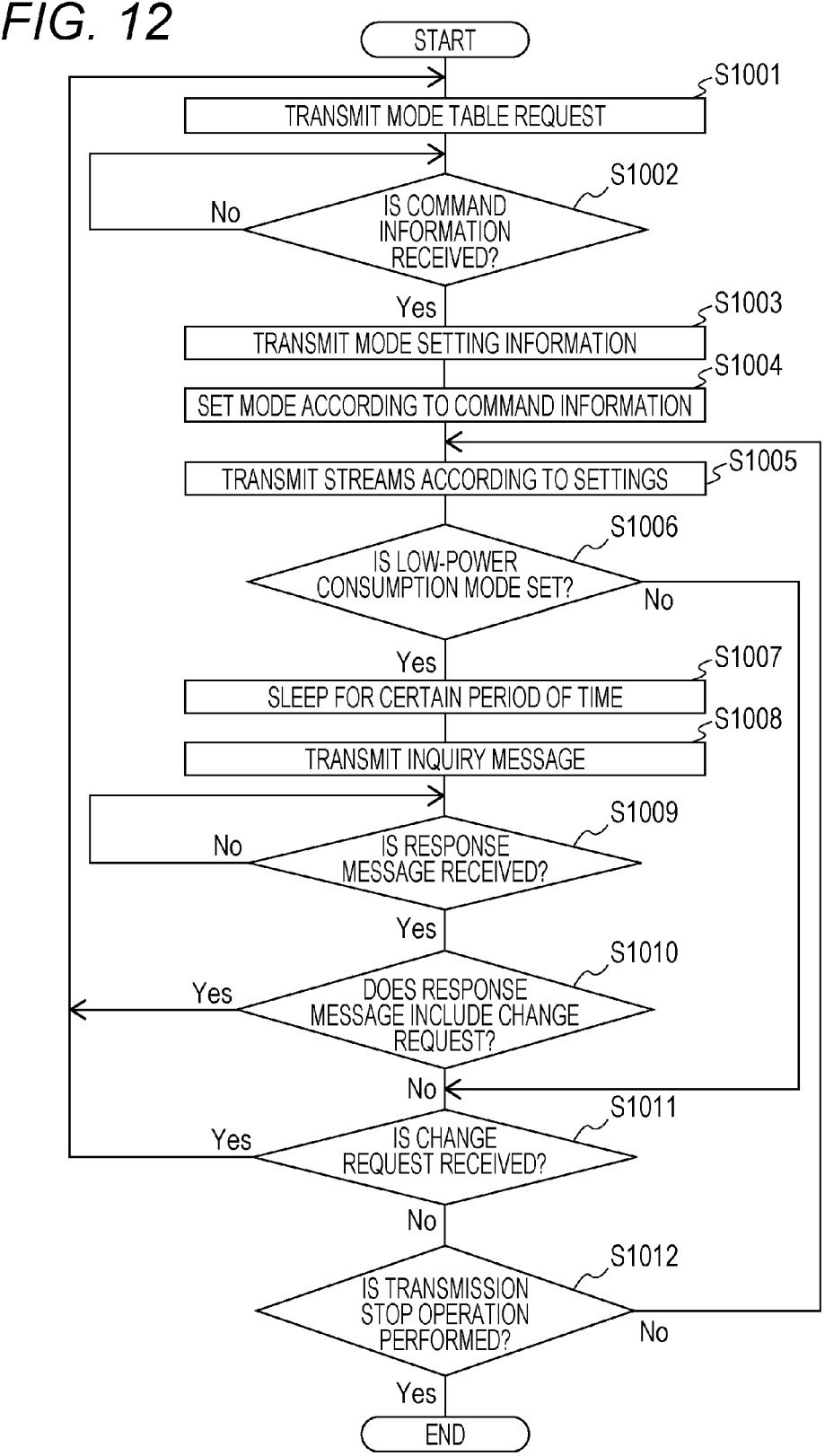
FIG. 12 is a flowchart of a procedure example of a data transmission process by an information processing apparatus 200 in the first embodiment of the present technology.

FIG. 12 is a flowchart of a procedure example of a data transmission process by the information processing apparatus 200 in the first embodiment of the present technology. FIG. 12 first describes the example in which the information processing apparatus 200 transmits to the information processing apparatus 300 streams (image data and audio data) at a standard resolution. In this case, the output according to the streams is provided to the information processing apparatus 300.

First, the control unit 240 transmits a mode table request to the information processing apparatus 300 (step S1001). Subsequently, the control unit 240 determines whether command information is received from the information processing apparatus 300 (step S1002). When no command information is received, the control unit 240 continues monitoring. When no command information is received even after waiting for a certain period of time, a timeout may occur to terminate the process. For example, under Wi-Fi CERTIFIED Miracast, a timeout is set for five to nine seconds depending on the status.

When command information is received from the information processing apparatus 300 (step S1002), the control unit 240 transmits to the information processing apparatus 300 mode setting information indicating that the mode will be set according to the received command information (step S1003).

Subsequently, the control unit 240 sets the mode according to the received command information (step S1004). In addition, when the command information includes a change request for increasing the resolution, the control unit 240 sets the resolution for the image and audio according to a change request. When the command information includes the change request for decreasing the resolution, the control unit 240 sets the resolution for the image and the audio quality for the audio according to the change request.

Subsequently, the control unit 240 performs the transmission process to transmit the streams to the information processing apparatus 300 according to the settings (step S1005).

Then, the control unit 240 determines whether the low-power consumption mode is set (step S1006). When the low-power consumption mode is not set (that is, the normal power consumption mode is set), the process moves to step S1011. When the low-power consumption mode is set (step S1006), the control unit 240 enters the sleep state for a certain period of time (step S1007).

Subsequently, the control unit 240 transmits an inquiry message to the information processing apparatus 300 (step S1008). The control unit 240 then determines whether a response message is received from the information processing apparatus 300 (step S1009). When no response message is received, the control unit 240 continues monitoring. When no response message is received even after waiting for a certain period of time, a timeout may occur to terminate the process. For example, under Wi-Fi CERTIFIED Miracast, a timeout is set for five to nine seconds depending on the status.

When a response message is received from the information processing apparatus 300 (step S1009), the control unit 240 determines whether the response message includes a change request (step S1010). When the response message includes a change request (step S1010), the process returns to step S1001.

When the response message includes no change request (step S1010), the control unit 240 determines whether a change request is received (step S1011). When a change request is received (step S1011), the process returns to step S1001. When no change request is received (step S1011), the control unit 240 determines whether a transmission stop operation is performed (step S1012). When a transmission stop operation is performed (step S1012), the control unit 240 terminates the data transmission process. When no transmission stop operation is performed (step S1012), the process returns to step S1005.

[Operation Example of Information Processing Apparatus (Sink Device)]

Figure 13:
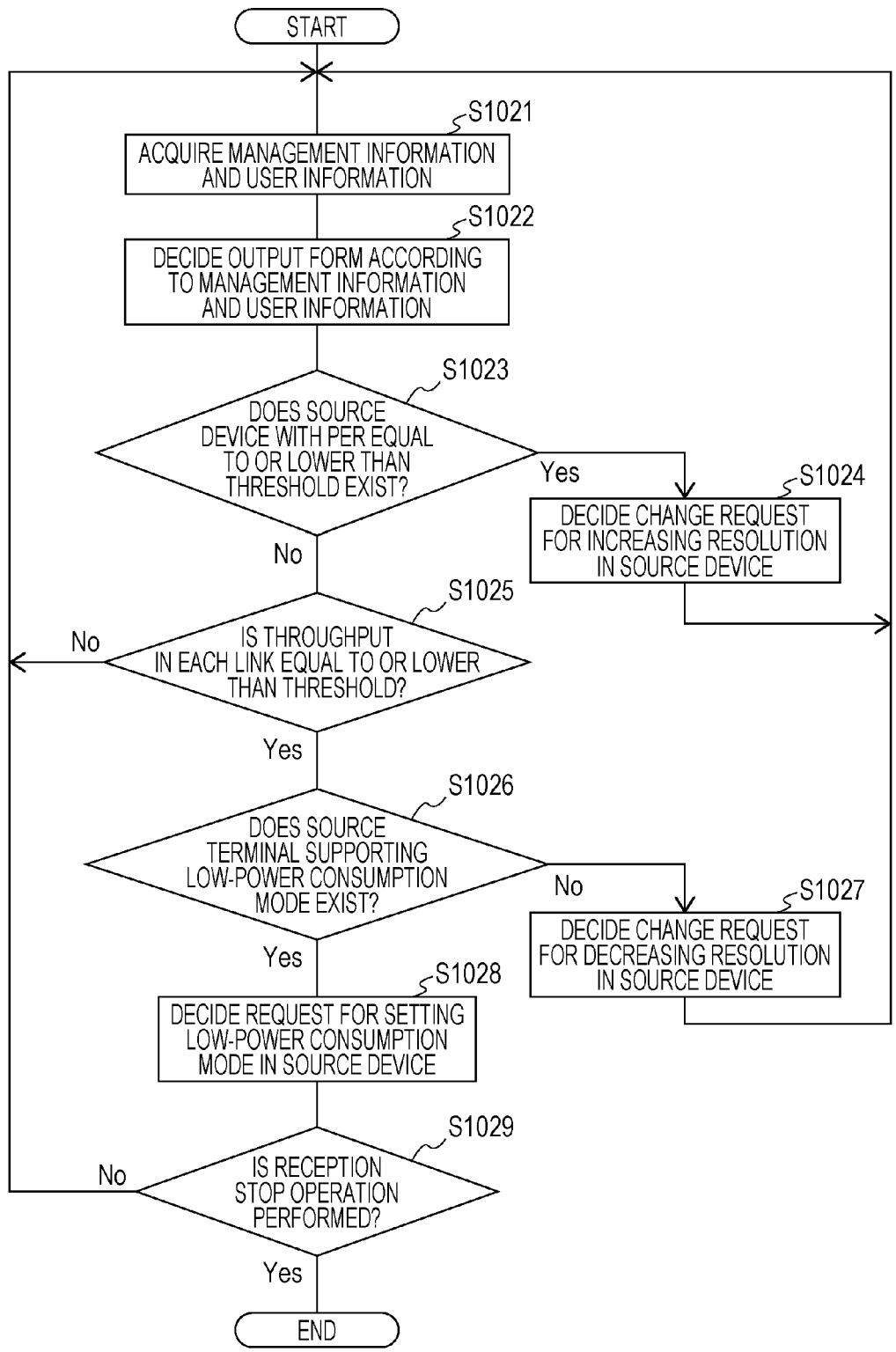
FIG. 13 is a flowchart of a procedure example of a data transmission rate control process by the information processing apparatus 300 in the first embodiment of the present technology.

FIG. 13 is a flowchart of a procedure example of a data transmission rate control process by the information processing apparatus 300 in the first embodiment of the present technology. FIG. 13 describes an example in which, when receiving streams (image data and audio data), the information processing apparatus 300 decides the contents of settings relating to the source devices (for example, resolution and power consumption mode).

For example, the control unit 370 of the information processing apparatus 300 may decide the resolutions and the frequency channels to be used, according to the user information indicating the main image and the link radio propagation environment between the information processing apparatus 300 and the source devices.

For example, the user performs an operation for selecting the image 12 in the state illustrated in FIG. 5a. In this case, it is preferred that the resolution for the image 12 is increased and the resolution for the image 11 is decreased. It is also preferred that the optimum resolutions for the images 11 and 12 are selected over time according to the link radio propagation environment in the source devices.

For example, the information processing apparatus 300 may flow data corresponding to the applicable throughput into a plurality of frequency channels to comprehend the radio propagation characteristics. In addition, for example, the information processing apparatus 300 may hold a table describing ideal throughputs for the plurality of frequency channels. The information processing apparatus 300 may also recognize the data transmission rates available for the frequency channels to be used and select the optimum frequency channels for the frequency channels, according to the number of source devices used at the same time and their PERs.

For example, the control unit 370 acquires the management information from the management information holding unit 390, and acquires the user information from the user information acquisition unit 360 (step S1021). The control unit 370 then decides the output form according to the acquired management information and user information (step S1022). Based on the decided output form, the images corresponding to two streams transmitted from each of the plurality of source devices are displayed at the display unit 351.

Then, the control unit 370 determines whether there exists any source device with a PER equal to or lower than a threshold included in the management information (step S1023). When there exists any source device with a PER equal to or lower than a threshold included in the management information (step S1023), the control unit 370 decides a change request for increasing the resolution for the source device (step S1024). Depending on the output form according to the user information, the control unit 370 may perform a control for assigning many data transmission rates to the main image. The change request is, for example, included in command information (for example, the command information described in FIG. 6) and transmitted to the source device. The control unit 370 may determine whether the throughput after the increase of the resolution for the source device falls within the threshold, and may control the rate for the streams according to the determination results.

When there exists no source device with a PER equal to or lower than the threshold included in the management information (step S1023), the control unit 370 determines whether the throughput of each of the source devices is equal to or lower than the threshold according to the management information (step S1025). That is, the control unit 370 determines whether the throughput in each of the links has no problem with the current frequency channel (step S1025).

When the throughput of each of the source devices is not equal to or lower than the threshold (step S1025), the process returns to step S1021. When the throughput of each of the source devices is equal to or lower than the threshold (step S1025), the control unit 370 determines whether there exists any source device supporting the low-power consumption mode according to the management information (step S1026).

When there exists any source device supporting the low-power consumption mode (step S1026), the control unit 370 decides a change request for setting the low-power consumption mode in the source device supporting the low-power consumption mode (step S1028). The change request is included in command information (for example, the command information described in FIG. 6), for example, and transmitted to the source device.

When there exists no source device supporting the low-power consumption mode (step S1026), the control unit 370 decides a change request for decreasing the resolution for the source device (with a PER equal to or lower than the threshold) (step S1027). The change request is included in command information (for example, the command information described in FIG. 6), for example, and transmitted to the source device.

The control unit 370 determines whether a reception stop operation is performed (step S1029). When a reception stop operation is performed, the control unit 370 terminates the data transmission rate control process. When no reception stop operation is performed, the process returns to step S1021. When there exists any source device in the sleep state due to the setting of the low-power consumption mode, the number of the source devices connected to the information processing apparatus 300 is decreased. In this case, the throughput threshold used at step S1025 may be changed. After the change of the throughput threshold as described above, the step equivalent to step S1025 may be further executed. Step S1021 is an example of a wireless communication procedure described in the claims. Steps S1023 to S1028 are an example of a control procedure described in the claims.

As described above, the control protocol can be implemented such that the sink device trains the line environment for a certain period of time and notifies the source devices of the resolutions for stable video communications. Alternatively, the control protocol may be implemented such that the source devices train the line environment for a certain period of time and make a request for the resolutions for stable video communications, and the sink device makes a response to the request.

As described above, the control unit 370 of the information processing apparatus 300 can perform the data transmission rate control on two streams transmitted from each of the source devices, according to the management information held by the management information holding unit 390 and the user information acquired by the user information acquisition unit 360.

The control unit 370 may perform the control such that the total data transmission rate of two streams transmitted from each of the information processing apparatus 200 and the information processing apparatus 400 becomes the lowest. For example, the maximum permitted value for the total data transmission rate is set at the control unit 370 of the information processing apparatus 300 at the reception side. The control unit 370 transmits a change request for decreasing the bit rate to the information processing apparatus 200 and then acquires from the stream reception unit 330 the bit rates of the two streams transmitted from each of the information processing apparatuses 200 and 400. Then, the control unit 370 calculates the total data transmission rate for the acquired two streams. The control unit 370 then decides the bit rate for the streams transmitted from the information processing apparatus 400 without exceeding the set maximum permitted value, and transmits a change request for increasing the bit rate to the information processing apparatus 400. When the streams cannot be accommodated in one frequency channel due to a large PER even at the lowest bit rate, an additional frequency channel may be used. When the transmission of the images (main image and sub image) is stopped for a certain period of time or more, the image data may be paused unless the user performs any operation (for example, pointing).

As described above, according to the first embodiment of the present technology, even in the case of receiving a plurality of streams transmitted from a plurality of source devices by one sink device, the appropriate data transmission rate control can be performed according to the user's operation, status, and intention. For example, the data transmission rate for some of the plurality of image and audio streams may be decreased and the data transmission rate for the remaining streams may be increased according to the user's operation, status, and intention.

When the sink device receives and displays a plurality of streams, for example, the user can enjoy important images and audios of high quality as the user sets from time to time. For less important images and audios, the optimum data transmission rate can be automatically adjusted in response to the frequency channel, power consumption, and transmission rate.

Figure 14:
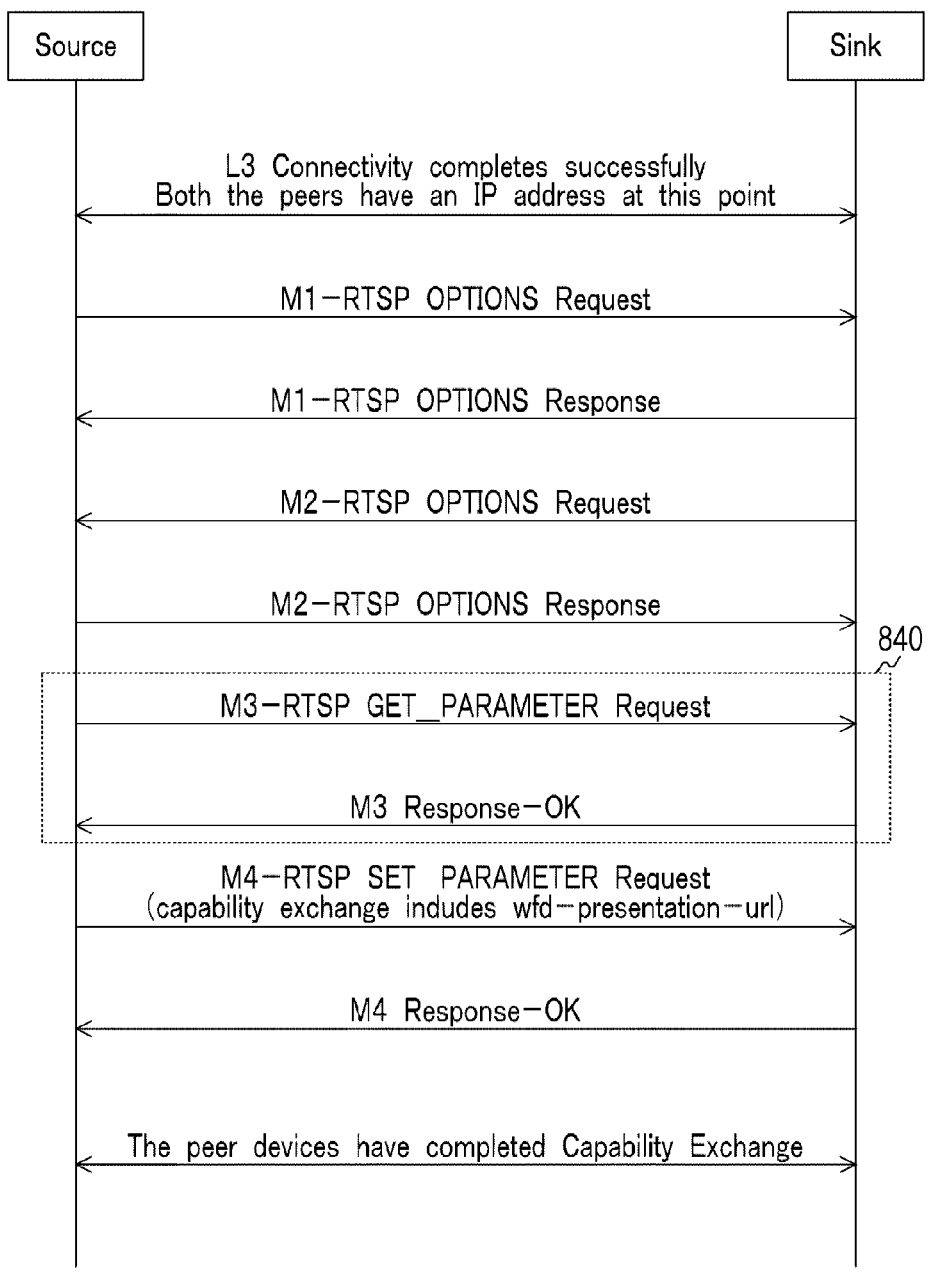
FIG. 14 is a sequence chart of a communication process example between a source device and a sink device in the first embodiment of the present technology.
Figure 15:
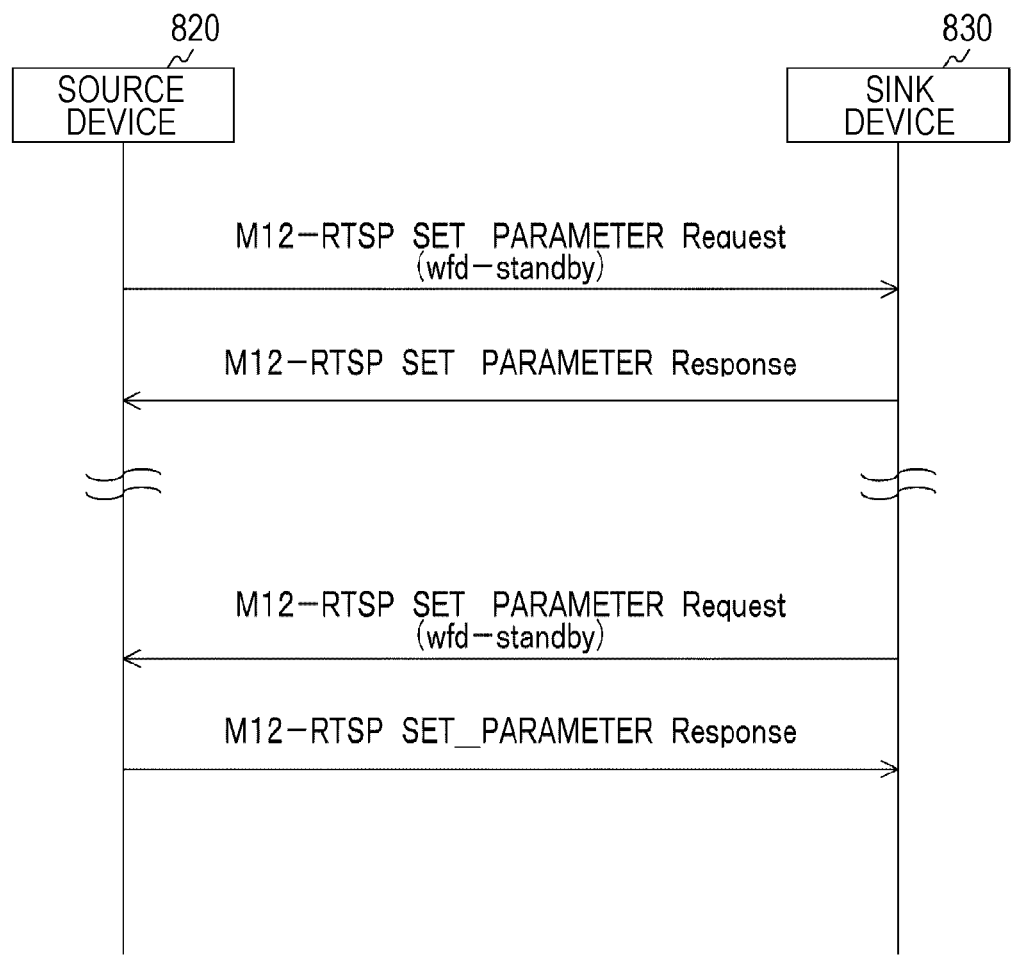
FIG. 15 is a sequence chart of a communication process example between the source device and the sink device in the first embodiment of the present technology.
Figure 16:
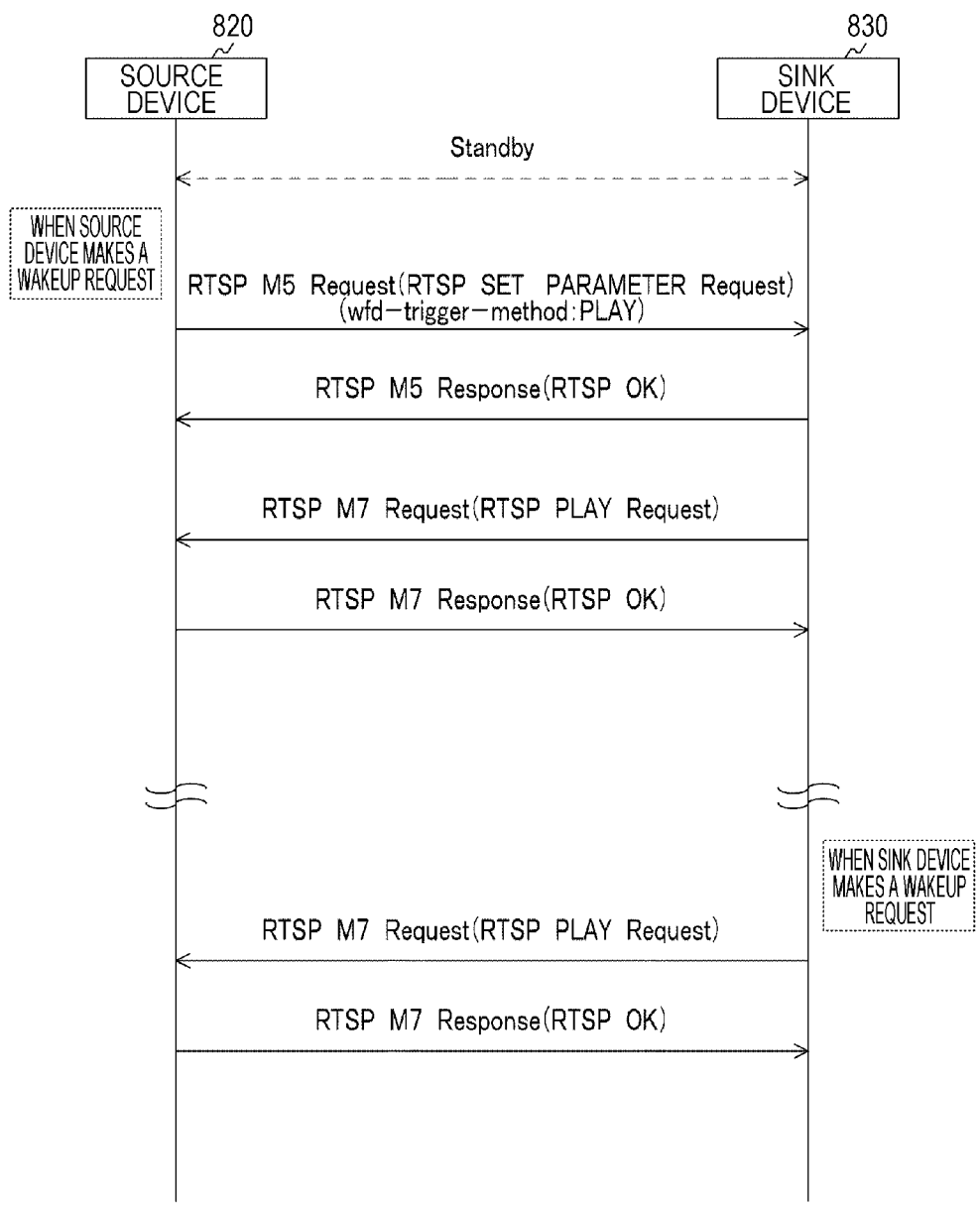
FIG. 16 is a sequence chart of a communication process example between the source device and the sink device in the first embodiment of the present technology.

The management information held by the management information holding unit 390 can be exchanged by the use of commands prepared in Wi-Fi CERTIFIED Miracast, for example. In this case, the exchange can be made by capability negotiation or capability re-negotiation set forth in the Wi-Fi Display specifications. Capability negotiation or capability re-negotiation is based on RFC5939 or Wi-Fi CERTIFIED Miracast specifications, for example. However, capability negotiation or capability re-negotiation is not limited to them but may be defined as a command for exchange of device performance information. FIGS. 14 to 16 illustrate a communication example of exchange with the use of commands in the Wi-Fi CERTIFIED Miracast specifications.

[Communication Example of Exchange Using Commands in Wi-Fi CERTIFIED Miracast Specifications]

FIGS. 14 to 16 form a sequence chart of a communication process example between a source device and a sink device in the first embodiment of the present technology. FIGS. 14 to 16 describe a communication example of exchange using RTSP protocol. A source device 820 corresponds to the information processing apparatuses 200 and 400, and a sink device 830 corresponds to the information processing apparatus 300.

First, the communication example will be described with reference to FIG. 14. For example, as described in a dot-line rectangular 840 in FIG. 14, an RTSP M3 Request (RTSP GET_PARAMETER Request) message is transmitted from the source device to the sink device, and an RTSP M3 Response (RTSP GET_PARAMETER Response) message is transmitted from the sink device to the source device in response to the former message. This exchange corresponds to the steps described in FIG. 6 (505 to 508) and the steps described in FIG. 8 (539 to 542), for example. The source device may transmit this message to the sink device as appropriate. For example, the exchange of the RTSP M3 Request (RTSP GET_PARAMETER Request) message and the RTSP M3 Response (RTSP GET_PARAMETER Response) message may be omitted, and the management information may be included in the message to be transmitted from the source device to the sink device, so that the management information is transmitted from the source device to the sink device and the sink device selects the information and holds the same in the management information holding unit 390.

The information on the power consumption mode can be exchanged with predetermined messages using RTSP protocol. For example, the following three kinds of management information (1) to (3) can be exchanged:

(1) Setting the standby mode (2) Canceling the standby mode in the source device or cancelling the standby mode in the sink device by the source device (3) Cancelling the standby mode in the sink device or cancelling the standby mode in the source device by the sink device First, the information exchange will be described with reference to FIG. 15. For example, in the case (1) of commands in Wi-Fi CERTIFIED Miracast, the information exchange for setting the standby mode can be made by the use of an RTSP M12 Request (RTSP SET_PARAMETER (with WFD-standby)) message transmitted from the source device 820 to the sink device 830 and an RTSP M12 Response (RTSP OK) message transmitted from the sink device 830 to the source device 820 in response to the former message. The information exchange for setting the standby mode in the sink device 830 by the source device 820 is performed in the same manner.

Next, the information exchange will be described with reference to FIG. 16. For example, in the case (2) of canceling the standby mode in the source device or cancelling the standby mode in the sink device by the source device, the source device 820 transmits to the sink device 830 an RTSP M5 Request (RTSP SET_PARAMETER (Request (wfd-trigger-method: PLAY)) message, and the sink device 830 transmits to the source device 820 an RTSP M5 Response (RTSP OK) message in response to the former message. The sink device 830 transmits to the source device 820 an RTSP M7 Request (RTSP PLAY Request) message and the source device 820 transmits to the sink device 830 an RTSP M7 Response (RTSP OK) message in response to the former message.

In the case (3) of canceling the standby mode in the sink device or cancelling the standby mode in the source device by the sink device, for example, the sink device 830 transmits to the source device 820 an RTSP M7 Request (RTSP PLAY Request) message, and the source device 820 transmits to the sink device 830 an RTSP M7 Response (RTSP OK) message in response to the former message. The exchange correspond to the steps described in FIG. 7 (515 to 518) and the steps described in FIG. 7 (535 to 538), for example.

In the information exchange at the steps described in FIG. 9 (565 to 570), for example, the sink device 830 transmits to the source device 820 an RTSP M12 Request (RTSP SET_PARAMETER (with WFD-standby)) message, and the source device 820 transmits to the sink device 830 an RTSP M12 Response (RTSP OK) message in response to the former message.

In the information exchange at steps described in FIG. 10 (584 to 589), for example, the sink device 830 transmits to the source device 820 an RTSP M7 Request (RTSP PLAY Request) message and, the source device 820 transmits to the sink device 830 an RTSP M7 Response (RTSP OK) message in response to the former message.

As described above, the wireless communication unit 320 can exchange with the source device the capability information by capability negotiation or capability re-negotiation set forth in the Wi-Fi Display specifications. In addition, the wireless communication unit 320 may exchange with the source device the capability information using RTSP M3 messages by capability negotiation or capability re-negotiation, for example.

As described above, the wireless communication unit 320 of the information processing apparatus 300 communicates with the source device to exchange the capability information on the information processing apparatus 300 and the capability information on the information processing apparatus 200, for example. In addition, the wireless communication unit 220 of the information processing apparatus 200 communicates with the information processing apparatus 300 to exchange the capability information on the information processing apparatus 200 and the capability information on the information processing apparatus 300. In these cases, the wireless communication units 220 and 320 can exchange the capability information by capability negotiation or capability re-negotiation.

The control unit 370 of the information processing apparatus 300 performs the data transmission rate control on the streams exchanged with the information processing apparatus 200 according to the capability information on the information processing apparatus 200, the radio propagation measurement information on communications with the information processing apparatus 200, and the usage of the information processing apparatus 300. In a stream transmission method different from that in the embodiment of the present technology, the control unit 240 of the information processing apparatus 200 may perform the data transmission rate control on streams exchanged with the information processing apparatus 300 under control of the information processing apparatus 300 according to the capability information on the information processing apparatus 200 and the radio propagation measurement information on communications of the streams with the information processing apparatus 300.

The control unit 370 of the information processing apparatus 300 performs a control for setting the power consumption mode in the information processing apparatus 200 according to the capability information on the information processing apparatus 200 (for example, the information indicating whether the information processing apparatus 200 is a mobile device). In this case, the control unit 370 may perform a control for setting the low-power consumption mode in the information processing apparatus 200 according to the capability information on the information processing apparatus 200 and the management information for management of the information processing apparatus 200. The control unit 240 of the information processing apparatus 200 sets the power consumption mode under control of the information processing apparatus 300 according to the capability information on the information processing apparatus 200. In the embodiment of the present technology, a topology with two source devices is taken as an example. However, the present technology is not limited to the embodiment. For example, in the case of using two or more source devices, the data transmission rate control needs to be performed for each of the devices, and thus the control is more complicated due to a large number of state transitions but is beneficial. The present technology is also applicable to a topology with two or more source devices connected to each other.

2. Second Embodiment

In the first embodiment of the present technology, wireless communications are controlled according to the user information and the management information. For example, if the source device is a mobile device, the source device may be moved. In such a case, it is assumed that the source device is out of range according to the frequency channel. In such a case, it is important to realize stable transmission with the use of an appropriate frequency channel.

Thus, in a second embodiment of the present technology, an appropriate frequency channel is set for a source device capable of using a plurality of frequency channels.

[Configuration Example of Communication System]

Figure 17:
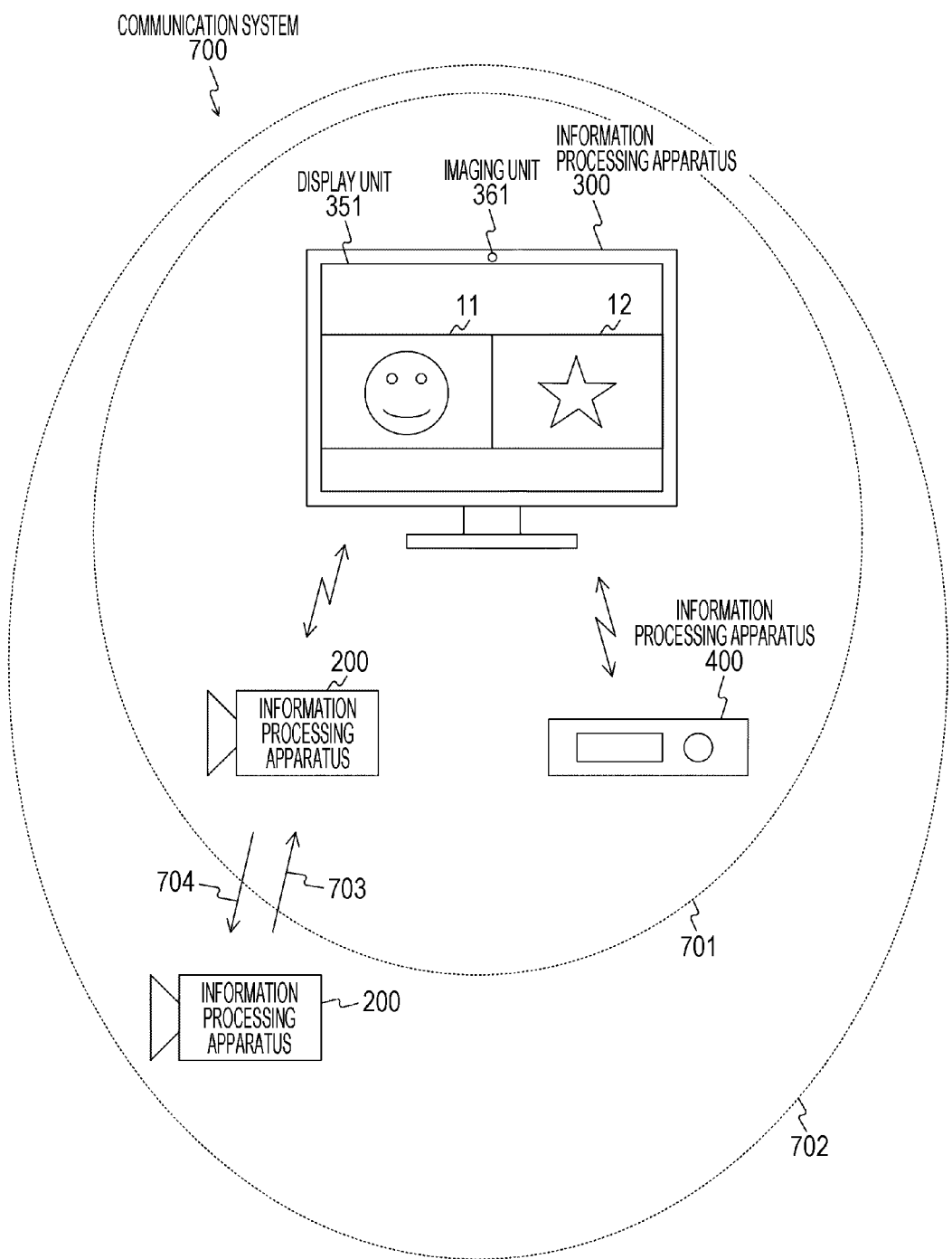
FIG. 17 is a block diagram of a system configuration example of a communication system 700 in a second embodiment of the present technology.

FIG. 17 is a block diagram of a system configuration example of a communication system 700 in the second embodiment of the present technology.

The configuration of the communication system 700 is similar to the configuration of the communication system 100 illustrated in FIG. 1. Accordingly, the same components in the communication system 700 as those in the communication system 100 illustrated in FIG. 1 will be given the same reference signs as those in the first embodiment, and some of descriptions thereof will be omitted.

FIG. 17 illustrates two radio wave ranges of different frequency channels as radio wave ranges (service coverages) of the information processing apparatus 300 by dot-line ovals 701 and 702, which is different from FIG. 1. For example, a first frequency channel is a 60-GHz band and has a radio wave range illustrated by the oval 701. The second frequency channel is a 2.4-GHz band and has a radio wave range illustrated by the oval 702.

In this example, the radio wave range 701 refers to the range (service coverage) in which it is assumed that the information processing apparatuses 200 and 400 can transmit streams to the information processing apparatus 300 by the use of the first frequency channel. The radio wave range 702 refers to a range (service coverage) in which it is assumed that the information processing apparatuses 200 and 400 can transmit streams to the information processing apparatus 300 by the use of the second frequency channel.

FIG. 17 also illustrates the example in which the information processing apparatus 200 is a mobile device and is being moved. In this example, while the information processing apparatus 300 and the information processing apparatus 400 transmit streams, the information processing apparatus 200 and the information processing apparatus 300 perform a connection process.

The information processing apparatus 200 is movable as described above. Accordingly, as illustrated by an arrow 703, for example, at start of the connection process with the information processing apparatus 300, the information processing apparatus 200 may be located out of the radio wave range 701, and then the information processing apparatus 200 may be moved within the radio wave range 701 during the connection process. In addition, as illustrated by an arrow 704, for example, at start of the connection process with the information processing apparatus 300, the information processing apparatus 200 may be located within the radio wave range 701 and then the information processing apparatus 200 may be moved out of the radio wave range 701 during the connection process.

For example, when the information processing apparatus 200 is located at the boundary with the radio wave range (service area boundary) during the connection process for wireless communications, it may take time to complete the connection process to distort the image in transmitted streams. This may affect wireless communications in other links sharing the same band (for example, the link between the information processing apparatus 400 and the information processing apparatus 300).

To cope with the connection environment as illustrated in FIG. 17, the session connection procedure between the information processing apparatus 200 and the information processing apparatus 300 preferably uses one of the two frequency channels with a wider service area. For example, in the second embodiment of the present technology, out of the two frequency channels, the second frequency channel (2.4 GHz band) with a wider service area is used.

That is, when the communication quality specified by the radio propagation measurement information becomes degraded and the data transmission rate control needs to be limited, the control unit 370 can perform a control for changing from the frequency channel to be used to another one at a higher data transmission rate according to the radio propagation measurement information and the usage of the information processing apparatus 300. In addition, when the communication quality specified by the radio propagation measurement information becomes degraded and the data transmission rate control needs to be limited, the control unit 370 can also perform a control for changing from the frequency channel to be used to another one at a lower data transmission rate according to the radio propagation measurement information and the usage of the information processing apparatus 300. For example, when the communication quality specified by the radio propagation measurement information becomes degraded and the data transmission rate control needs to be limited, in the case where the second frequency channel is currently used but is to be changed for another one at a higher data transmission rate, the control unit 370 can change from the second frequency channel to the first frequency channel according to the radio propagation measurement information and the usage of the information processing apparatus 300. Meanwhile, in the case where the first frequency channel is currently used but is to be changed for another one at a lower data transmission rate, the control unit 370 can change from the first frequency channel to the second frequency channel. In the embodiment of the present technology, the data transmission rate control may not be performed by switching between the frequency channels or may be performed by any other method. For example, the data transmission rate control may be performed by changing the bandwidths. Taking as an example, a plurality of bandwidths is supported by 802.11, such as 20 MHz, 40 MHz, 80 MHz, 160 MHz, and the like. As the bandwidth is wider, the data transmission rate becomes higher. Accordingly, when the communication quality specified by the radio propagation measurement information becomes degraded and the data transmission rate control needs to be limited, the control unit 370 may widen or narrow the bandwidth. As described above, by making comprehensively the capability settings on the information processing apparatus 200 according to the usage of the information processing apparatus 300 (for example, the display form at the display unit 351 and the movement state of the information processing apparatus 300) and the radio propagation environment, the entire system can be highly stabled.

When the information processing apparatus 200 is moved in the direction of the arrow 704, the information processing apparatus 200 is moved in the direction in which the wireless communication quality becomes degraded. Accordingly, it is necessary to change the frequency channels because it is difficult to reduce the throughput to decrease the communication quality.

When the information processing apparatus 200 is moved in the direction of the arrow 704, the user may be prompted to provide an instruction for disconnecting the information processing apparatus 200 to increase the image quality and audio quality in other links or for changing the frequency channel of the information processing apparatus 200 without disconnecting the information processing apparatus 200. For example, a pop-up dialog box may be displayed at the information processing apparatus 300 to prompt the user to provide an instruction for disconnecting the information processing apparatus 200 to increase the image quality and audio quality in other links. In addition, for example, a message for asking on whether to display the pop-up dialog box at the information processing apparatus 200 may be displayed at the information processing apparatus 300 such that, when the user provides the instruction for displaying the pop-up dialog box at the information processing apparatus 200, the pop-up dialog box is displayed at the information processing apparatus 200. In this case, the user of the information processing apparatus 200 can provide the instruction. To provide a more stable link, communications are preferably started by a communication method at a lower transmission rate rather than a communication method at a higher transmission rate.

When the user permits the disconnection in the pop-up dialog box, for example, the information processing apparatus 300 performs a process for stopping transmission of streams to the information processing apparatus 200 until the link radio propagation status is improved. In this case, the management information on the information processing apparatus 200 is erased from the management information holding unit 390.

In addition, for example, when the user does not permit the disconnection in the pop-up dialog box, the information processing apparatus 300 performs a process for changing the frequency channel of the information processing apparatus 200.

As described above, the control unit 370 can perform a control for displaying at the display unit 351 the display information (for example, a pop-up dialog box) relating to whether to disconnect or not the currently used frequency channel. When the user's operation for indicating that the disconnection of the currently used frequency channel is not permitted is accepted, the control unit 370 performs a control for switching from the frequency channel to another one.

As in the foregoing examples, the user is prompted to provide an instruction at the timing when the information processing apparatus 200 is moved in the arrow 704 direction. Alternatively, a process to be performed in such a situation may be preset.

For example, while stream transmission is carried out in a link between the information processing apparatus 400 and the information processing apparatus 300, it is necessary to perform a process without exerting any influence on stream transmission in other links. Accordingly, the pre-setting is preferred rather than the method by which to prompt the user to provide an instruction at the timing when the information processing apparatus 200 is moved. In this case, automatic link switching cause image degradation due to a change in the resolution, and thus any indication of the current state such as 2.4 G or 60 G may be displayed to notify the user of the link change state.

In a predictable operating environment, the information processing apparatus 200 is frequently moved between the radio wave ranges 701 and 702. Hereinafter, descriptions will be given as to an example in which the first frequency channel and the second frequency channel are switched at a high speed.

[Example of Acquisition of Management Information]

Figure 18:
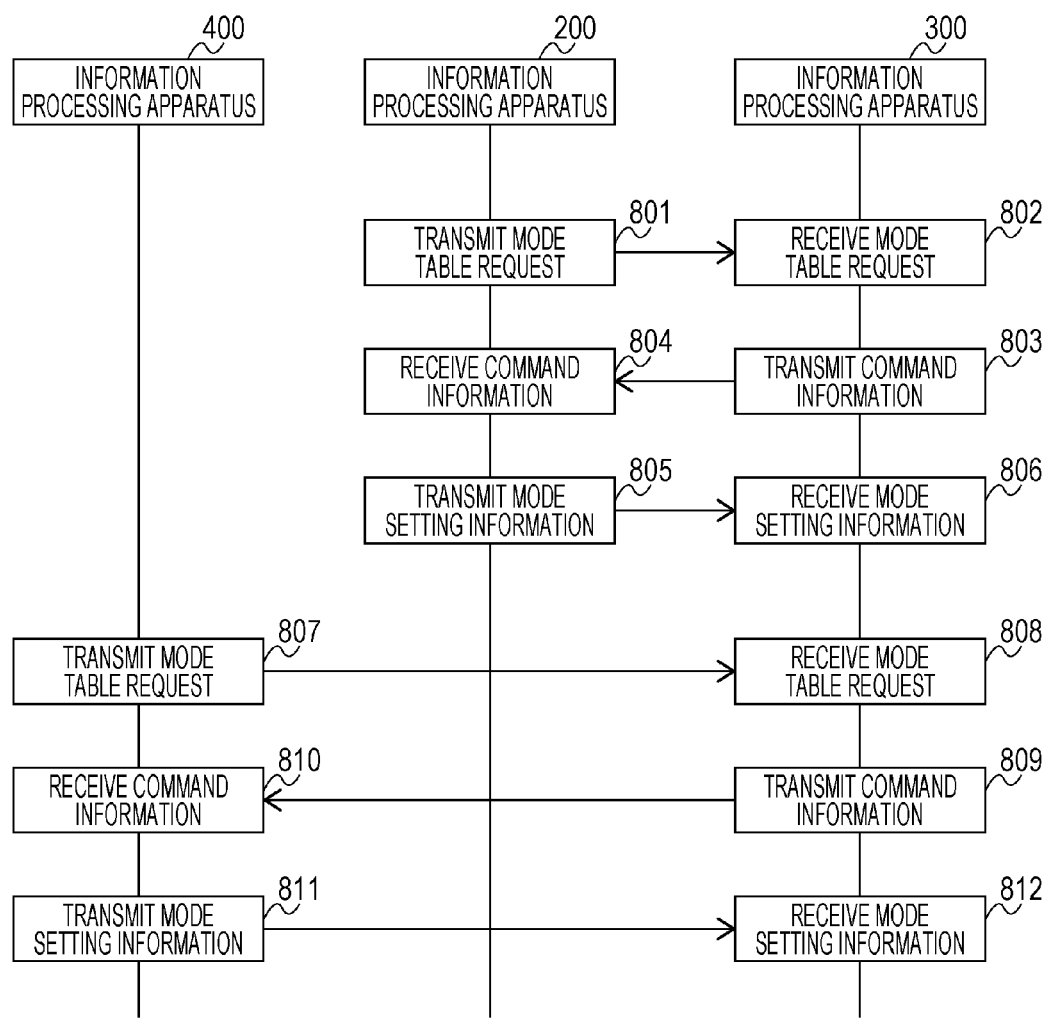
FIG. 18 is a sequence chart of a communication process example between apparatuses constituting the communication system 700 in the second embodiment of the present technology.

FIG. 18 is a sequence chart of a communication process example between apparatuses constituting the communication system 700 in the second embodiment of the present technology. FIG. 18 describes an example in which the information processing apparatus 300 acquires the management information on the information processing apparatus 200 and the management information on the information processing apparatus 400.

Steps described in FIG. 18 (801 to 806) and (807 to 812) correspond to the steps described in FIG. 6 (505 to 510).

Referring to FIG. 18, the management information on the information processing apparatuses may be acquired by a method different from that in the example of acquisition of the management information in the first embodiment of the present technology.

[Example of Operation of Information Processing Apparatus]

Figure 19:
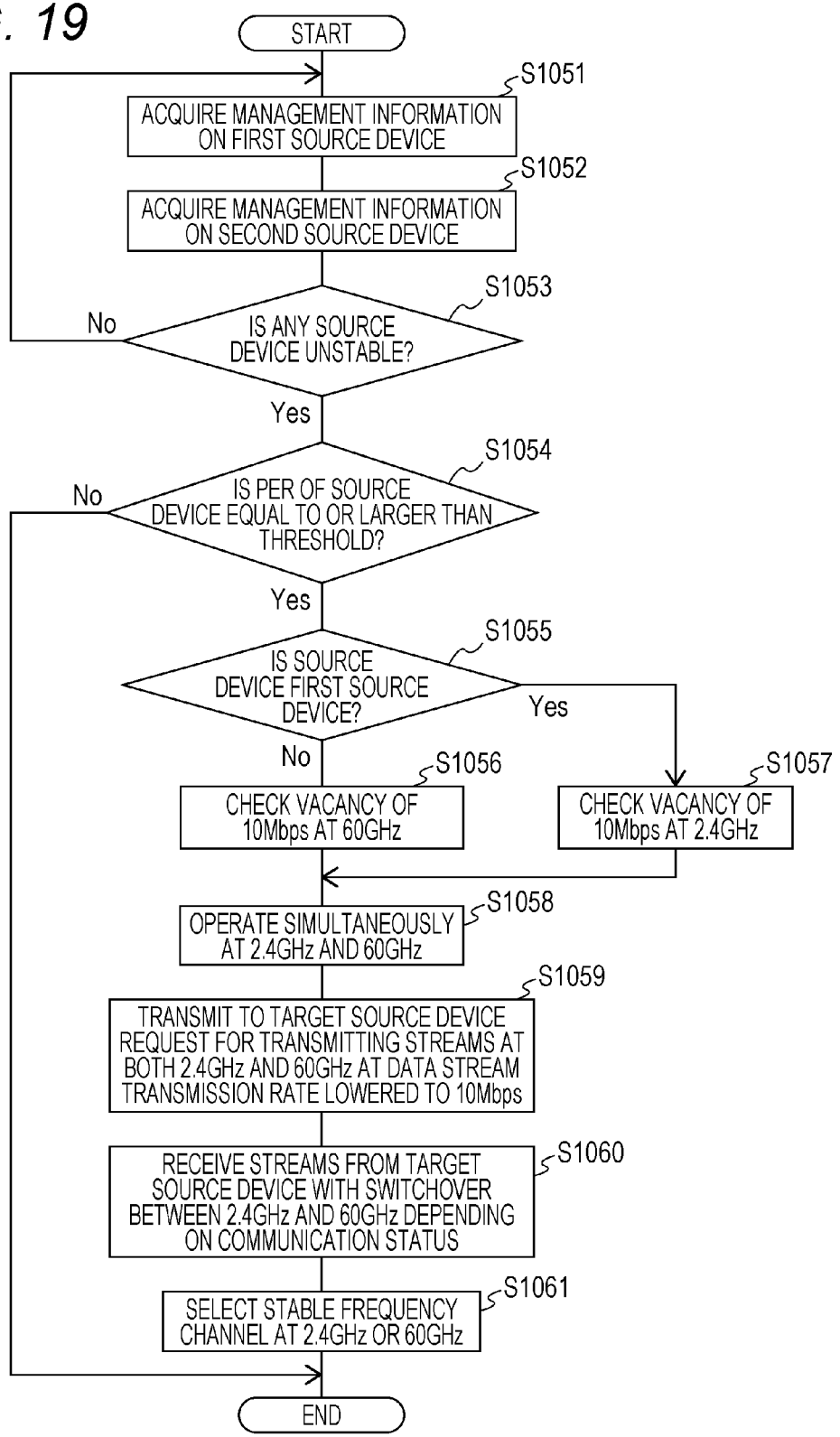
FIG. 19 is a flowchart of a procedure example of a frequency channel setting process by the information processing apparatus 300 in the second embodiment of the present technology.

FIG. 19 is a flowchart of a procedure example of a frequency channel setting process by the information processing apparatus 300 in the second embodiment of the present technology. FIG. 19 describes an example in which the information processing apparatus 300 makes a link with the information processing apparatus 200 (first link) and makes a link with the information processing apparatus 300 (second link). At the start of the process procedure described in FIG. 19, transmission of contents is performed in the first link by the use of the first frequency channel, and transmission of contents is performed in the second link by the use of the second frequency channel. FIG. 19 also describes connection setting by which to determine whether there is no problem in data transmission rate in both of the two frequency channels, and switch between the two frequency channels at a high speed with consideration given to the data transmission rates in other links.

First, the control unit 370 acquires the management information on a first source device (information processing apparatus 200) (step S1051). Then, the control unit 370 acquires the management information on a second source device (information processing apparatus 400) (step S1052). The acquired management information is held by the management information holding unit 390. The method for acquiring the management information is described in FIG. 18.

Then, the control unit 370 determines whether the source devices connected to the information processing apparatus 300 are unstable (step S1053). In this example, when any of the source devices is unstable, the distorted image may be displayed at the display unit 351, for example. When none of the source devices is unstable (step S1053), the process returns to step S1051.

When any of the source devices is unstable (step S1053), the control unit 370 determines the stability of the link with the unstable source device (target source device) (step S1054). For example, the control unit 370 determines whether the PER of the source device is equal to or larger than a threshold (step S1054). When the PER of the source device is smaller than the threshold, the control unit 370 determines that the link with the source device is stable and thus terminates the frequency channel setting process.

In this example, PER is used as an index for determining the stability of a link, but any other index may be used instead. For example, the stability of a link may be determined by the use of an index such as BER, RSSI, PER, the number of packet retransmissions, throughput, dropping frame, or SIR. In addition, packet delay received at the receiving side may be determined so that the information on the packet delay is used as radio propagation measurement information. The packet delay constitutes an index for determining radio propagation because, at occurrence of any error, for example, a delay occurs in transmission to the receiving side due to a retransmission process in layer 2. The packet delay also constitutes an index for determining whether the characteristics of any link become degraded in a wireless system in which a plurality of apparatuses shares a wireless bandwidth.

When the PER of the source device is equal to or larger than the threshold (step S1054), the control unit 370 identifies the unstable link (step S1055). That is, the control unit 370 determines whether the source device is the first source device (step S1055). The control unit 370 then checks the vacancy states of frequency channels different from the frequency channel currently used by the source device (steps S1056 and S1057).

For example, when the source device is the second source device (step S1055), the control unit 370 checks the vacancy states of frequency channels different from the frequency channel currently used by the second source device (step S1056). When the source device is the first source device (step S1055), the control unit 370 checks the vacancy states of frequency channels different from the frequency channel currently used by the first source device (step S1057).

As described above, in the second embodiment of the present technology, the frequency channels at 2.4 GHz and 60 GHz are used as an example. The data transmission rates of the two frequency channels are estimated to be different by 10 times or more. For convenience of description, it is here assumed that the two frequency channels have a maximum throughput of 30 Mbps.

After checking the vacancy states of the data transmission rates (steps S1056 and S1057), the control unit 370 performs a simultaneous operation at 2.4 GHz and 60 GHz on the unstable link (step S1058). For example, when the first source device (information processing apparatus 200) is unstable, the first source device (information processing apparatus 200) is allowed to use newly 2.4 GHz to perform stream communications while switching between 60 GHz and 2.4 GHz. In this case, the stream data transmission rate needs to be lowered to 10 Mbps for seamless switching between 60 GHz and 2.4 GHz. This provides an advantage that, even in the situation where switchover takes place between 60 GHz and 2.4 GHz, streams of images and audio can be produced without being conscious of wireless environments. However, the present technology is not limited to the embodiment of the present technology. For example, streams of separate throughputs may be generated at 60 GHz and 2.4 GHz such that switchover takes place in synchronization with each other. For example, this process is enabled by the use of a low-delay codec.

The control unit 370 decreases the stream data transmission rate to 10 Mbps, and transmits to the target source device (for example, the information processing apparatus 200) a request for transmission of streams with switchover between 60 GHz and 2.4 GHz (step S1059). As described above, the control unit 370 performs a control for limiting the data transmission rate before switching the currently used frequency channel to another one.

Subsequently, the information processing apparatus 300 receives the streams from the target source device having transmitted the request, with switchover between 60 GHz and 2.4 GHz according to the communication state (step S1060).

Subsequently, the control unit 370 selects a stable frequency channel from between the frequency channels of 60 GHz and 2.4 GHz. The control unit 370 then transmits to the target source device (for example, the information processing apparatus 200) a request for transmission of streams by the use of the selected frequency channel (step S1060). Accordingly, the stable link is selected to perform stable stream communications.

The foregoing thresholds may be changed depending on whether the source device is a mobile device. Accordingly, when the source device is a mobile device, it is possible to realize stable transmission with switchover easier to occur.

When the source device as a target of frequency channel change (target source device) is a mobile device, the use of two frequency channels at the same time tends to burn the battery. Accordingly, the information processing apparatus 200 may determine the frequency channel to be used according to the information received from the information processing apparatus 300. To make the determination, it is necessary to include the information on the links with all of the source devices connected to the information processing apparatus 300 in the information from the information processing apparatus 300 (for example, the command information illustrated in FIG. 6) so that the information processing apparatus 200 can acquire the included information. Accordingly, the information processing apparatus 200 can select a stable frequency based on the thus acquired information relating to all of the source devices. The information processing apparatus 200 can also determine whether the selection has no influence on other links. Alternatively, the management information indicating that the information processing apparatus 200 is a mobile device may be provided in advance to the information processing apparatus 300, so that the information processing apparatus 300 can determine the frequency channel with stable stream transmission according to the data transmission rate control information on the entire system.

As described above, the information processing apparatus 200 and the information processing apparatus 300 are information processing apparatuses capable of wireless communications using a plurality of frequency channels. The control unit 370 of the information processing apparatus 300 performs a control for setting one of the plurality of frequency channels for the information processing apparatus 200 according to the capability information on the information processing apparatus 200 and the radio propagation measurement information. In this case, the control unit 370 of the information processing apparatus 300 may perform a control for setting one frequency channel according to the radio propagation measurement information obtained by measurement of transmission of the streams from the information processing apparatus 200 with switchover between the plurality of frequency channels.

In the second embodiment of the present technology, the first frequency channel is used as a 60-GHz band and the second frequency channel as a 2.4-GHz band. However, the present technology is not limited to this. For example, the first frequency channel may be used as a 5-GHz band and the second frequency channel as a 2.4-GHz band.

In the second embodiment of the present technology, the two frequency channels are used. However, the present technology is not limited to this. For example, the present technology is also applicable to the case of using other two frequency channels (for example, LTE-A and 2.4 GHz, or LTE-A and 60 GHz). In addition, the present technology is also applicable to the case of using three or more frequency channels. For example, the present technology is also applicable to information processing apparatuses using three frequency channels of 2.4 GHz, 5 GHz, and 60 GHz.

As described above, according to the embodiment of the present technology, it is possible to reduce unnecessary power consumption in the sink device outputting data based on streams from a plurality of source devices, by making adjustments to the resolution for the streams, stopping transmission, and changing the frequency channel. This realizes communications suited to mobile devices. This also realizes communications with improvement in band use efficiency of the frequency channel and enhancement in robustness.

Specifically, the sink device managing a plurality of links performs scheduling to reduce battery consumption in the mobile devices. The sink device may perform the scheduling of the entire system such that the mobile devices capable of using a plurality of frequency channels uses only one frequency channel. Even in a topology requiring switchover between the different frequency channels, it is possible to realize stable transmission by making the switchover prone to occur according to the device information (for example, whether the device is a mobile device). Even with the difference between the frequency channels, it is possible to exchange the information (management information and user information) in an appropriate manner. In the embodiment of the present technology, the topology is configured to include the two links with the two source devices. However, the present technology is not limited to the embodiment of the present technology. For example, in the case of using two or more source devices, the data transmission rate control needs to be performed for each of the devices, and thus the control is more complicated due to a large number of state transitions but is beneficial. For example, the embodiment of the present technology is also applicable to a topology in which two or more source devices are connected.

The embodiment of the present technology is also applicable to other apparatuses with the wireless communication function. For example, the embodiment of the present technology is also applicable to imaging apparatuses with the wireless communication function (for example, digital still cameras, and digital video cameras (camera-included recorders)). In addition, the embodiment of the present technology is also applicable to display apparatuses with the wireless communication function (for example, televisions, projectors, and personal computers) and portable information processing apparatuses (for example, smartphones and tablet terminals).

3. Application Examples

The technique in this disclosure is applicable to various products. For example, the information processing apparatuses 200, 300, and 400 may be implemented as mobile terminals such as smartphones, tablet PCs (Personal Computers), note PCs, portable game terminals, or digital cameras, fixed terminals such as television receivers, printers, digital scanners, or network storages, or in-vehicle terminals such as car navigation devices. The information processing apparatuses 200, 300, and 400 may also be implemented as terminals performing M2M (Machine To Machine) communications (also called MTC (Machine Type Communication) terminals) such as smart meter, automatic vendors, remote monitoring devices, or POS (Point Of Sale) terminals. Further, the information processing apparatuses 200, 300, and 400 may be wireless communication modules (for example, integrated circuit modules composed of one die) included in the foregoing terminals.

3-1. First Application Example

Figure 20:
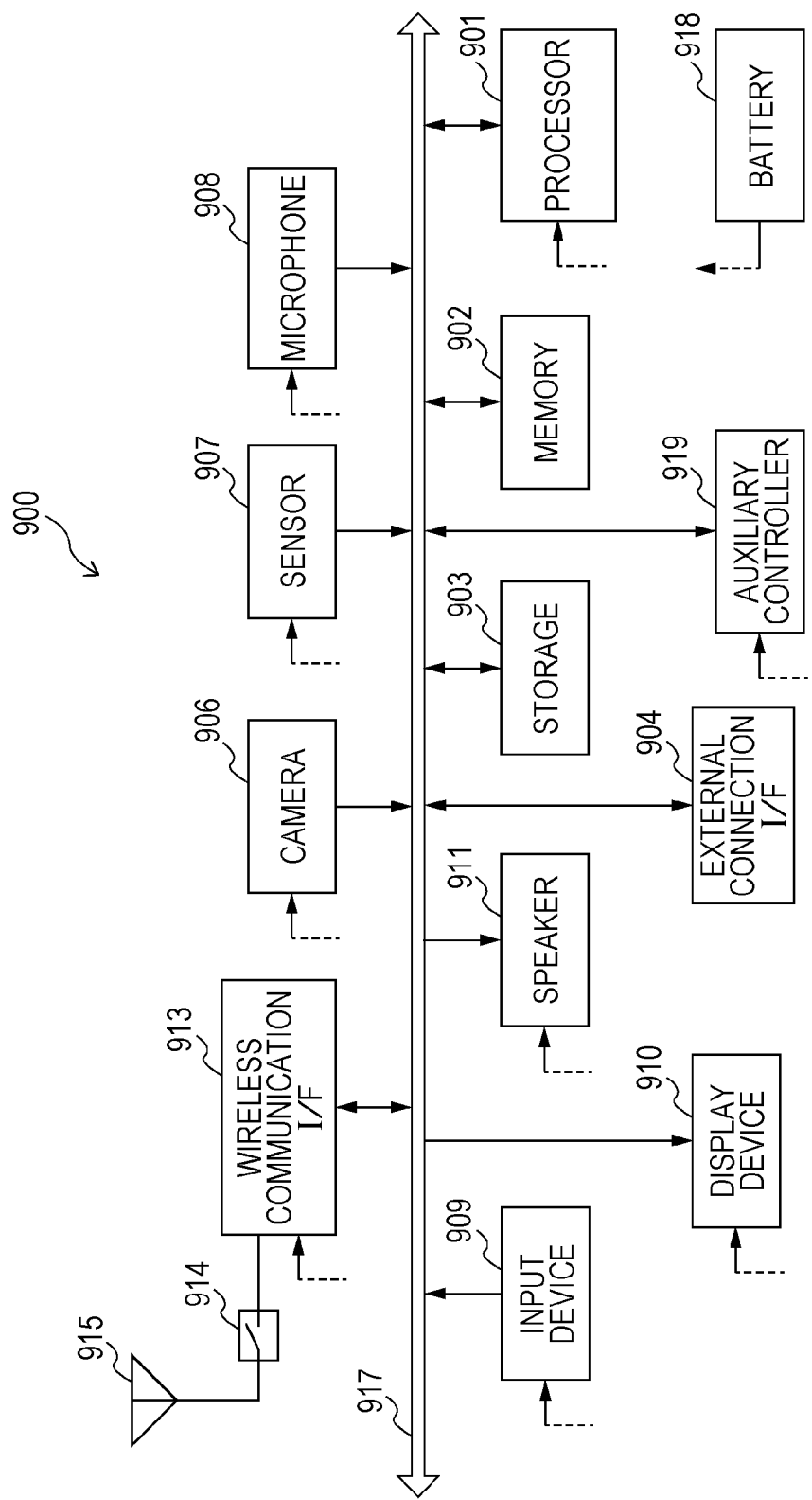
FIG. 20 is a schematic block diagram of a configuration example of a smartphone.

FIG. 20 is a schematic block diagram of a configuration example of a smartphone 900 to which the technique in this disclosure is applicable. The smartphone 900 includes a processor 901, a memory 902, a storage 903, an external connection interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be a CPU (Central Processing Unit) or a SoC (System on Chip) that controls the functions of an application layer and other layers of the smartphone 900. The memory 902 includes a RAM (Random Access Memory) and a ROM (Read Only Memory), and stores programs to be executed by the processor 901 and data. The storage 903 may include a recording medium such as a semiconductor memory or a hard disc. The external connection interface 904 is an interface for connecting an external device such as a memory card or a USB (Universal Serial Bus) device to the smartphone 900.

The camera 906 has an imaging element such as a CCD (Charge Coupled Device) or a CMOS (Complementary Metal Oxide Semiconductor) to generate an image, for example. The sensor 907 may include a sensor group of a positioning sensor, a gyro sensor, a geomagnetic sensor, and an acceleration sensor, for example. The microphone 908 converts audio input into the smartphone 900 to an audio signal. The input device 909 includes a touch sensor that detects a touch on the screen of the display device 910, a keypad, a keyboard, buttons, or switches, for example, to accept operations performed by the user or information entered by the user. The display device 910 has a screen of a liquid crystal display (LCD) or an organic light emitting diode (OLED) display to display an output image of the smartphone 900. The speaker 911 converts the audio signal from the smartphone 900 into audio.

The wireless communication interface 913 supports one or more of wireless LAN standards such as IEEE8020.11a, 11b, 11g, 11n, 11ac, and 11ad to execute wireless communications. The wireless communication interface 913 may communicate with another apparatus via a wireless LAN access point in an infrastructure mode. The wireless communication interface 913 may also communicate directly with another apparatus in an ad-hoc mode or a direct communication mode such as Wi-Fi Direct. In the Wi-Fi Direct mode, one of two terminals acts as an access point unlike in the ad-hoc mode, and communications are carried out directly between the two terminals. The wireless communication interface 913 may include typically a baseband processor, an RF (Radio Frequency) circuit, a power amplifier, and the like. The wireless communication interface 913 may be a one-chip module in which a memory storing a communication control program, a processor executing the program, and a related circuit are integrated. The wireless communication interface 913 may support other types of wireless communication methods such as the near field wireless communication method, the proximity wireless communication method, or the cellular communication method as well as the wireless LAN method. The antenna switch 914 switches the connection destination of the antenna 915 between a plurality of circuits included in the wireless communication interface 913 (for example, the circuits for different wireless communication methods). The antenna 915 has one or more antenna elements (for example, a plurality of antenna elements constituting an MIMO antenna) and is used for transmission and reception of wireless signals by the wireless communication interface 913.

The smartphone 900 is not limited to the example of FIG. 20 but may include a plurality of antennas (for example, an antenna for wireless LAN and an antenna for proximity wireless communication methods, and the like). In this case, the antenna switch 914 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 913, and the auxiliary controller 919 to one another. The battery 918 supplies power to each of the blocks of the smartphone 900 illustrated in FIG. 20 via power lines partially illustrated by dot lines in FIG. 20. The auxiliary controller 919 performs necessary minimum functions of the smartphone 900 in the sleep mode, for example.

In the smartphone 900 illustrated in FIG. 20, the control unit 240 described above with reference to FIG. 2 and the control unit 370 described above with reference to FIG. 3 may be implemented in the wireless communication interface 913. In addition, at least some of their functions may be implemented in the processor 901 or the auxiliary controller 919.

The smartphone 900 may act as a wireless access point (software AP) by the processor 901 performing the access point function in the application level. The wireless communication interface 913 may have the wireless access point function.

3-2. Second Application Example

Figure 21:
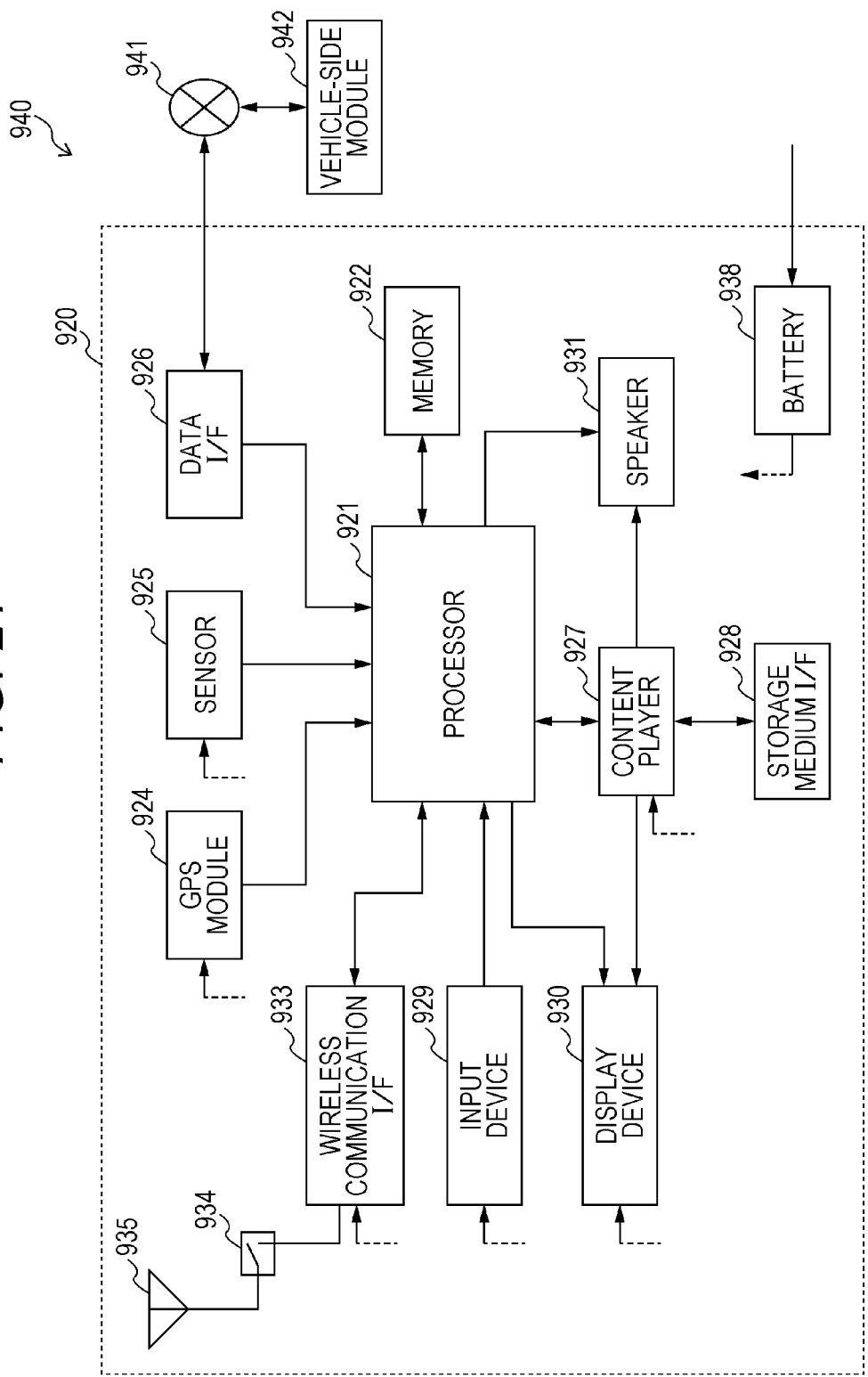
FIG. 21 is a schematic block diagram of a configuration example of a car navigation apparatus.

FIG. 21 is a schematic block diagram of a configuration example of a car navigation apparatus 920 to which the technique in this disclosure is applicable. The car navigation apparatus 920 includes a processor 921, a memory 922, a GPS (Global Positioning System) module 924, a sensor 925, a data interface 926, a contents player 927, a storage medium interface 928, an input device 929, a display device 930, a speaker 931, a wireless communication interface 933, an antenna switch 934, an antenna 935, and a battery 938.

The processor 921 may be a CPU or a SoC, for example, to control the navigation function and other functions of the car navigation apparatus 920. The memory 922 includes a RAM and a ROM to store programs to be executed by the processor 921 and data.

The GPS module 924 uses a GPS signal received from a GPS satellite to measure the position of the car navigation apparatus 920 (for example, latitude, longitude, and altitude). The sensor 925 may include a sensor group of a gyro sensor, a geomagnetic sensor, an atmospheric pressure sensor, and the like, for example. The data interface 926 is connected to an in-vehicle network 941 via a terminal not illustrated, for example, to acquire data generated at the vehicle side such as vehicle speed data.

The contents player 927 replays contents stored in a storage medium (for example, a CD or a DVD) inserted into the storage medium interface 928. The input device 929 includes a touch sensor that detects a touch on the screen of the display device 930, buttons, or switches, for example, to accept operations performed by the user or information entered by the user. The display device 930 has a screen of an LCD or OLED display to display images of the navigation function and images of the contents replayed. The speaker 931 outputs audio of the navigation function or audio of the contents replayed.

The wireless communication interface 933 supports one or more of wireless LAN standards such as IEEE802.11a, 11b, 11g, 11n, 11ac, and 11ad to execute wireless communications. The wireless communication interface 933 may communicate with another apparatus via a wireless LAN access point in an infrastructure mode. The wireless communication interface 933 may also communicate directly with another apparatus in an ad-hoc mode or a direct communication mode such as Wi-Fi Direct. The wireless communication interface 933 may include typically a baseband processor, an RF circuit, a power amplifier, and the like. The wireless communication interface 933 may be a one-chip module in which a memory storing a communication control program, a processor executing the program, and a related circuit are integrated. The wireless communication interface 933 may support other types of wireless communication methods such as the near field wireless communication method, the proximity wireless communication method, or the cellular communication method as well as the wireless LAN method. The antenna switch 934 switches the connection destination of the antenna 935 between a plurality of circuits included in the wireless communication interface 933. The antenna 935 has one or more antenna elements and is used for transmission and reception of wireless signals by the wireless communication interface 933.

The car navigation apparatus 920 is not limited to the example of FIG. 21 but may include a plurality of antennas. In this case, the antenna switch 934 may be omitted from the configuration of the car navigation apparatus 920.

The battery 938 supplies power to each of the blocks of the car navigation apparatus 920 illustrated in FIG. 21 via power lines partially illustrated by dot lines in FIG. 21. The battery 938 accumulates power supplied from the vehicle side.

In the car navigation apparatus 920 illustrated in FIG. 21, the control unit 240 described above with reference to FIG. 2 and the control unit 370 described above with reference to FIG. 3 may be implemented in the wireless communication interface 933. In addition, at least some of their functions may be implemented in the processor 921.

The technique in this disclosure may be implemented as an in-vehicle system (or a vehicle) 940 including one or more blocks of the car navigation apparatus 920, the in-vehicle network 941, and a vehicle-side module 942. The vehicle-side module 942 generates the vehicle-side data such as vehicle speed, engine revolutions, or failure information, and outputs the generated data to the in-vehicle network 941.

The foregoing embodiments are mere examples for carrying out the present technology. There are correspondences between the matters in the embodiments and the matters specific to the invention described in the claims. Similarly, there are correspondences between the matters specific to the invention described in the claims and the matters in the embodiments of the present technology with the same names as those of the matters described in the claims. However, the present technology is not limited to the foregoing embodiments but can also be carried out with various modifications of the embodiments without deviating from the gist of the present technology.

The process procedures described in relation to the foregoing embodiments may be regarded as methods with these procedures or as programs for causing a computer to execute the series of procedures or as a recording medium recording these programs. The recording medium may be a CD (Compact Disc), an MD (Mini Disc), a DVD (Digital Versatile Disc), a memory card, a Blu-ray (registered trademark) disc, or the like, for example.

The present technology may be configured as follows:

(1)

An information processing apparatus that receives a stream for outputting image information from another information processing apparatus through wireless communications, including:

a wireless communication unit that performs communications with the other information processing apparatus for exchanging capability information on the information processing apparatus and capability information on the other information processing apparatus; and a control unit that performs a stream data transmission rate control relating to the other information processing apparatus, according to the capability information on the other information processing apparatus, radio propagation measurement information on communications with the other information processing apparatus, and usage of the information processing apparatus.

(2)

The information processing apparatus according to (1), wherein the information processing apparatus and the other information processing apparatus are information processing apparatuses capable of performing wireless communications using a plurality of frequency channels, and the control unit performs a control for setting one of the plurality of frequency channels, according to the capability information on the other information processing apparatus, the radio propagation measurement information, and the usage of the information processing apparatus.

(3)

The information processing apparatus according to (2), wherein the control unit performs a control for setting the one frequency channel, according to the radio propagation measurement information obtained by measuring a stream from the other information processing apparatus with switchover between the plurality of frequency channels and the usage of the information processing apparatus.

(4)

The information processing apparatus according to (2), wherein the control unit performs a control for, when communication quality specified by the radio propagation measurement information becomes degraded and the data transmission rate control needs to be limited, changing from the frequency channel to be used to another frequency channel at a higher data transmission rate, according to the radio propagation measurement information and the usage of the information processing apparatus.

(5)

The information processing apparatus according to (2), wherein the control unit performs a control for, when communication quality specified by the radio propagation measurement information becomes degraded and the data transmission rate control needs to be limited, changing from the frequency channel to be used to another frequency channel at a lower data transmission rate, according to the radio propagation measurement information and the usage of the information processing apparatus.

(6)

The information processing apparatus according to any of (2) to (5), wherein the control unit performs a control for limiting the data transmission rate before switching from the currently used frequency channel to another frequency channel.

(7)

The information processing apparatus according to any of (2) to (6), wherein the control unit performs a control for displaying at a display unit display information on permission of disconnection of the currently frequency channel.

(8)

The information processing apparatus according to any of (2) to (7), wherein the control unit performs a control for switching the frequency channel, on acceptance of a user operation indicating that the disconnection of the currently used frequency channel is not permitted.

(9)

The information processing apparatus according to any of (1) to (8), wherein the wireless communication unit exchanges the capability information by capability negotiation or capability re-negotiation set forth in Wi-Fi Display specifications.

(10)

The information processing apparatus according to (9), wherein the capability information is exchanged using RTSP M3 messages by capability negotiation or capability re-negotiation.

(11)

An information processing apparatus that transmits a stream for outputting image information to another information processing apparatus through wireless communications, the information processing apparatus including:

a wireless communication unit that performs communications with the other information processing apparatus for exchanging capability information on the information processing apparatus and capability information on the other information processing apparatus; and a control unit that performs a stream data transmission rate control relating to the other information processing apparatus, under control of the other information processing apparatus, according to the capability information on the information processing apparatus, radio propagation measurement information on communications with the other information processing apparatus, and usage of the other information processing apparatus.

(12)

An information processing method for receiving a stream for outputting image information from another information processing apparatus through wireless communications, the information processing method including:

a wireless communication step of performing communications with the other information processing apparatus for exchanging capability information on the information processing apparatus and capability information on the other information processing apparatus; and a control step of performing a stream data transmission rate control relating to the other information processing apparatus, according to the capability information on the other information processing apparatus, radio propagation measurement information on communications with the other information processing apparatus, and usage of the information processing apparatus.

REFERENCE SIGNS LIST

100 Communication system
101 Information transmission range
200 Information processing apparatus
201 Data transmission system
202 Line control system
210 Antenna
220 Wireless communication unit
230 Control signal reception unit
240 Control unit
250 Image/audio signal generation unit
260 Image/audio compression unit
270 Stream transmission unit
300 Information processing apparatus
301 Line control system
302 Input/output system
310 Antenna
320 Wireless communication unit
330 Stream reception unit
340 Image/audio decompression unit
350 Image/audio output unit
351 Display unit
352 Audio output unit
360 User information acquisition unit
370 Control unit
380 Control signal transmission unit
390 Management information holding unit
400 Information processing apparatus
700 Communication system
900 Smartphone
901 Processor
902 Memory
903 Storage
904 External connection interface
906 Camera
907 Sensor
908 Microphone
909 Input device
910 Display device
911 Speaker
913 Wireless communication interface
914 Antenna switch
915 Antenna
917 Bus
918 Battery
919 Auxiliary controller
920 Car navigation apparatus
921 Processor
922 Memory
924 GPS module
925 Sensor
926 Data interface
927 Contents player
928 Storage medium interface
929 Input device
930 Display device
931 Speaker
933 Wireless communication interface
934 Antenna switch
935 Antenna
938 Battery
941 In-vehicle network
942 Vehicle-side module

The invention claimed is:

1. A sink device, comprising:
circuitry configured to:
receive, a first video stream having a first resolution, from a first source device of a plurality of source devices;
receive, a second video stream having one of the first resolution or a second resolution, from a second source device of the plurality of source devices;
transmit, to the first source device, a first request to change the first resolution of the first video stream to a third resolution of the first video stream;
select a first frequency channel, from a plurality of frequency channels, for the first source device, based on the first request;
generate, a first control signal to control a first data transmission rate of the first source device, based on the transmitted first request;
transmit, to the first source device, the first control signal;
determine a total data transmission rate of the first video stream and the second video stream;
generate, a second control signal to control a second data transmission rate of the second source device, based on:
a second request to change the one of the first resolution or the second resolution of the second video stream to a fourth resolution of the second video stream; and
the total data transmission rate that is less than a maximum data transmission rate for the sink device;
select a second frequency channel, from the plurality of frequency channels, for the second source device, based on the second request;
transmit, to the second source device, the second control signal;
receive, the first video stream having the third resolution, at the controlled first data transmission rate; and
receive, the second video stream having the fourth resolution, at the controlled second data transmission rate; and
a display device configured to concurrently display the first video stream having the first resolution and the second video stream having the one of the first resolution or the second resolution.

2. The sink device according to claim 1, wherein the circuitry is further configured to transmit, at least one of the first request, the first control signal or the second control signal, based on a real-time streaming protocol (RTSP).

3. A sink device, comprising:
circuitry configured to:
receive, a first video stream having a first resolution, from a first source device of a plurality of source devices;

receive, a second video stream having the first resolution or a second resolution, from a second source device of the plurality of source devices;

transmit, to the first source device, a first request to change the first resolution of the first video stream to a third resolution of the first video stream, based on a preference associated with the sink device;

select a first frequency channel, from a plurality of frequency channels, for the first source device, based on the first request;

generate, a first control signal to control a first data transmission rate of the first source device, based on the transmitted first request;

transmit, to the first source device, the first control signal;

determine a total data transmission rate of the first video stream and the second video stream;

generate, a second control signal to control a second data transmission rate of the second source device, based on:
 a second request to change the one of the first resolution or the second resolution of the second video stream to a fourth resolution of the second video stream; and
 the total data transmission rate that is less than a maximum data transmission rate for the sink device;

select a second frequency channel, from the plurality of frequency channels, for the second source device, based on the second request;

transmit, to the second source device, the second control signal;

receive, the first video stream having the third resolution, at the controlled first data transmission rate; and receive, the second video stream having the fourth resolution, at the controlled second data transmission rate; and a display device configured to concurrently display the first video stream having the first resolution and the second video stream having the one of the first resolution or the second resolution.

4. The sink device according to claim 1, wherein the circuitry is further configured to transmit an inquiry request to determine that the first source device supports low-power consumption mode.

5. The sink device according to claim 1, wherein the circuitry is further configured to:
receive at the display device, first information from a user, based on the display of the first video stream and the second video stream; and
generate the first control signal based on at least one of the first information or management information,
wherein the management information corresponds to a second information for management of a connection of each of the plurality of source devices with the sink device based on at least one of terminal identification information, frequency channel information, radio propagation measurement information, band usage information, or device type information associated with each of the plurality of source devices and the sink device.

6. The sink device according to claim 5, wherein the circuitry is further configured to:
control a first frame size and a first display area of a first image frame of the first video stream on the display device, based on the generated first control signal; and
control a second frame size and a second display area of a second image frame of the second video stream on the display device, based on the generated second control signal.

7. The sink device according to claim 1, wherein the circuitry is further configured to control a power consumption mode of the first source device, based on the first frequency channel.

8. The sink device according to claim 1, wherein the circuitry is further configured to:
select a first power consumption mode that relates to the first frequency channel; and
select a second power consumption mode that relates to the second frequency channel,
wherein a third data transmission rate associated with the second frequency channel is higher than a fourth data transmission rate associated with the first frequency channel.

9. The sink device according to claim 1, wherein the circuitry is further configured to control display of at least one of the first video stream or the second video stream, at a corresponding requested resolution, based on a preference associated with the sink device.

10. The sink device according to claim 9, wherein the circuitry is further configured to control a corresponding data transmission rate for each of the first source device and the second source device based on the display of at least one of the first video stream or the second video stream at the corresponding requested resolution.

11. A sink device, comprising:
circuitry configured to:
receive, a first video stream having a first resolution, from a first source device of a plurality of source devices;
receive, a second video stream having one of the first resolution or a second resolution, from a second source device of the plurality of source devices;
transmit, to the first source device, a first request to change the first resolution of the first video stream to a third resolution of the first video stream;
generate, a first control signal to control a first data transmission rate of the first source device, based on the first request;
transmit, to the first source device, the first control signal;
determine a total data transmission rate of the first video stream and the second video stream;
select a first frequency channel from a plurality of frequency channels, for the first source device, based on the first request;
generate, a second control signal to control a second data transmission rate of the second source device, based on:
 a second request to change the one of the first resolution or the second resolution of the second video stream to a fourth resolution of the second video stream; and
 the total data transmission rate that is less than a maximum data transmission rate for the sink device;
transmit, to the second source device, the second control signal;
select a second frequency channel from the plurality of frequency channels, for the second source device, based on the second request;

select a first power consumption mode corresponding to the first frequency channel and a second power consumption mode corresponding to the second frequency channel,
    wherein a third data transmission rate associated with the second frequency channel is higher than a fourth data transmission rate associated with the first frequency channel;
receive, the first video stream having the third resolution, at the controlled first data transmission rate; and
receive, the second video stream having the fourth resolution, at the controlled second data transmission rate; and
a display device configured to concurrently display the first video stream having the first resolution and the second video stream having the one of the first resolution or the second resolution.

* * * * *